US009737831B2

(12) United States Patent
Miller et al.

(10) Patent No.: US 9,737,831 B2
(45) Date of Patent: Aug. 22, 2017

(54) UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD

(71) Applicant: ECONOVA, Inc., Clearfield, UT (US)

(72) Inventors: C. Michael Miller, Pleasant Grove, UT (US); David A. Bell, Farmington, UT (US)

(73) Assignee: ECONOVA INC., Clearfield, UT (US)

( * ) Notice: Subject to any disclaimer, the term of this patent is extended or adjusted under 35 U.S.C. 154(b) by 323 days.

(21) Appl. No.: 14/336,220

(22) Filed: Jul. 21, 2014

(65) Prior Publication Data

US 2014/0329657 A1    Nov. 6, 2014

Related U.S. Application Data

(63) Continuation-in-part of application No. 14/104,970, filed on Dec. 12, 2013, now Pat. No. 9,527,012,
(Continued)

(51) Int. Cl.
*B01D 17/02* (2006.01)
*B04B 11/02* (2006.01)
(Continued)

(52) U.S. Cl.
CPC ..... *B01D 17/0217* (2013.01); *B01D 17/0214* (2013.01); *B01D 17/12* (2013.01);
(Continued)

(58) Field of Classification Search
CPC ................ B01D 17/12; B01D 17/0214; B01D 17/0217; C02F 1/20; C02F 1/38;
(Continued)

(56) References Cited

U.S. PATENT DOCUMENTS 3,140,258 A * 7/1964 Hornbostel, Jr. ....... B04B 11/04
                                                           210/112
3,228,594 A * 1/1966 Amero ..................... B04B 1/20
                                                            494/23
(Continued)

FOREIGN PATENT DOCUMENTS

EP           0239199 A1 * 9/1987 ......... B01D 17/0211
WO    WO 2011130259 A1 * 10/2011 ......... B01D 17/0217

OTHER PUBLICATIONS

Exterran, Deep Bad Nutshell Filter Evolution, p. 1-15, 2013.
(Continued)

*Primary Examiner* — Charles Cooley
(74) *Attorney, Agent, or Firm* — Pate Baird, PLLC

(57) ABSTRACT

A continuous centrifugal separator (CCS) system provides a laminar, annular, velocity distribution (LAVD) throughout, using axially staged and radially staged distribution of incoming flows. Diffuser plates help establish the LAVD at comparatively low (stably laminar) Reynolds numbers in axial flow through a trapezoidal (trapezoid of rotation) rotor shell. Dynamic cleaning (during uninterrupted operation) by feedback control of fluid and system conditions (e.g., turbidity, vibration) may be set and reset by feedback control. Static cleaning removes deposits not flushed by dynamic cleaning. A coalescence plate encourages collapse of the dispersion band to a thin boundary between separated species at a central radius optimized by operating parameters, such as mass flow rate and rotational velocity.

19 Claims, 17 Drawing Sheets

Related U.S. Application Data which is a continuation-in-part of application No. 14/104,916, filed on Dec. 12, 2013, now Pat. No. 9,433,877.

(60) Provisional application No. 61/814,760, filed on Apr. 22, 2013, provisional application No. 61/814,760, filed on Apr. 22, 2013.

(51) Int. Cl.
| | |
|---|---|
| *B04B 13/00* | (2006.01) |
| *B04B 1/04* | (2006.01) |
| *B04B 5/04* | (2006.01) |
| *B01D 17/12* | (2006.01) |
| *C02F 1/20* | (2006.01) |
| *C02F 1/38* | (2006.01) |
| *C02F 1/28* | (2006.01) |
| *C02F 101/32* | (2006.01) |
| *C02F 103/10* | (2006.01) |

(52) U.S. Cl.
CPC .............. *B04B 1/04* (2013.01); *B04B 5/0442* (2013.01); *B04B 11/02* (2013.01); *B04B 13/00* (2013.01); *C02F 1/20* (2013.01); *C02F 1/38* (2013.01); *B04B 2013/006* (2013.01); *C02F 1/286* (2013.01); *C02F 2101/32* (2013.01); *C02F 2103/10* (2013.01); *C02F 2301/022* (2013.01)

(58) Field of Classification Search
CPC ................ C02F 1/286; C02F 2301/022; C02F 2103/10; C02F 2101/32; B04B 1/04; B04B 5/0442; B04B 13/00; B04B 11/02; B04B 2013/006
USPC ......................................... 494/37, 43, 64, 85
See application file for complete search history.

(56) References Cited

U.S. PATENT DOCUMENTS

| | | | | |
|---|---|---|---|---|
| 4,643,834 | A * | 2/1987 | Batutis | B01D 17/0211 210/522 |
| 6,348,154 | B1 | 2/2002 | Stewart | |
| 6,607,473 | B2 * | 8/2003 | Collier | B04B 1/02 |
| 6,719,681 | B2 * | 4/2004 | Collier | B04B 1/02 |
| 7,060,017 | B2 * | 6/2006 | Collier | B04B 1/02 |
| 7,314,441 | B2 * | 1/2008 | Collier | B04B 1/02 |
| 8,187,474 | B2 | 5/2012 | Freeman | |
| 9,433,877 | B2 * | 9/2016 | Miller | B04B 11/02 |
| 9,527,012 | B2 * | 12/2016 | Miller | B04B 11/02 |
| 2009/0204419 | A1 | 8/2009 | Stewart | |
| 2010/0175311 | A1 * | 7/2010 | Allen | B01F 3/0807 44/403 |
| 2011/0247500 | A1 * | 10/2011 | Akhras | B01D 17/0217 96/182 |
| 2011/0263405 | A1 * | 10/2011 | Parkinson | B04B 1/04 494/2 |
| 2017/0043357 | A1 * | 2/2017 | Sherman | B04B 5/0442 |

OTHER PUBLICATIONS

McGraw Hill Higher Education, Unit Operations of Chemical Engineering, Seventh Edition, p. Chapter 2, pg. 39-41, 2005.

Eastern Economy Edition, Transport Processes and Separation Process Principles, Christie John Geankoplis, Fourth Edition, p. 932-939, 2003.

John Wiley & Sons, Department of Chemical Engineering, R. Byron Bird, Warren E. Stewart, Edwin N. Lightfoot, Transport Phenomena, p. 85, 1960.

Wiley-India, Dale E. Seborg, Process Dynamics and Control, Second Edition, Thomas F. Edgar, Duncan A. Mellichamp, p. 159-160 and p. 443-435, 2004.

McGraw Hill, Perry's Chemical Engineers' Handbook, Eighth Edition, Don W. Green, p. 18-114-116, 15-91-93, and 15-96-102, 2008.

High-Tech Consultants, Inc., Oilfield Water-Oil-Solids Separation, Bill Ball, Sep. 19, p. 1-17, 2005.

IOP Publishing, Nanostructured materials for water desalination, T. Humplik, J. Lee, S.C. O'her, B.A. Fellman, M.A. Baig, S.F. Hassan, M.A. Atich, F. Rahman, T. Laoui, R. Karnik, E.N. Wang, p. 1-19, 2011.

* cited by examiner

UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD

RELATED APPLICATIONS

This application: is a continuation-in-part of co-pending U.S. patent application Ser. No. 14/104,970, filed Dec. 12, 2013, entitled DYNAMIC, INFLUENT-CONSTITUENT-BASED, SEPARATOR CONTROL APPARATUS AND METHOD, which claims the benefit of U.S. Provisional Patent Application Ser. No. 61/814,760, filed Apr. 22, 2013, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD; and is a continuation-in-part of co-pending U.S. patent application Ser. No. 14/104,916, filed Dec. 12, 2013, entitled AUTOMATIC, ON-THE-FLY, SEPARATOR OPTIMIZATION APPARATUS AND METHOD, now U.S. Pat. No. 9,433.877 issued Sep. 6, 2016, 2012, which claims the benefit of U.S. Provisional Patent Application Ser. No. 61/814,760, filed Apr. 22, 2013, entitled UNVENTED, BACK-PRESSURE-CONTROLLED, LAMINAR-ANNULAR-VELOCITY-DISTRIBUTION, CONTINUOUS CENTRIFUGAL SEPARATOR APPARATUS AND METHOD; all of which are hereby incorporated by reference. This application also hereby incorporates by reference U.S. Pat. No. 6,607,473 entitled METHODS FOR CENTRIFUGALLY SEPARATING MIXED COMPONENTS OF A FLUID STREAM UNDER A PRESSURE DIFFERENTIAL issued Aug. 19, 2003 to Collier.

BACKGROUND

Field of the Invention

This invention relates to centrifuges and, more particularly, to novel systems and methods for centrifugal separators.

Background Art

A centrifuge has the characteristic of spinning a material, and relying on the angular velocity to increase an effective weight of the contained material. That is, the weight of a material in a gravitational field is related to mass times the acceleration of gravity, one "g." In contrast, the angular acceleration of a material or a body is in the direction of the center rotation.

It is a principal of physics that an angular velocity is typically measured in radians, and every full revolution contains two Pi radians. In general, any point undergoes a radial acceleration equal to the radius at which acceleration is measured multiplied by the angular velocity squared. Thus a wheel, a centrifuge, or any other material or object rotating about a rotational axis has an angular acceleration proportional to the angular velocity squared multiplied by the radius at which acceleration is measured.

Centrifuges have been known and used for over one hundred years in various industrial applications. For example, a cream separator provided continuous, two-dimensional separation by exposing raw milk to a centrifuge having discs. Discs were actually shaped as frustums of cones. That is, each was conical in shape, but truncated nearest the point or vertex. Centrifugation of milk caused a migration of heavier species (the higher water content of skim milk) downward under the influence of gravity and outward under the influence of the centrifuge). At the same time, cream was separated as the lighter, fat-based, cream species inward and upward.

Centrifuges are used in batch mode as well. For example, hospital laboratories maintain centrifuges for separating out blood constituents in preparation for tests, and the like. Many other industrial centrifuges are similarly used in batch mode.

Typically, centrifugal separators operating on a continual basis are cylindrical in geometry, must vent gases exuded by the liquids therein, and must be open to vent gases into the atmosphere or some collection system.

Industrial centrifuges have included cyclones, wherein the centrifugal forces are not induced by moving parts. For example, a conventional saw mill introduces sawdust in a flow of air progressing tangentially along and inside an outer wall of a cyclone. Heavier particles, of the sawdust, tend to react to the requirement for angular acceleration towards the center, by striking the outer wall, slowing down, and thus dropping to the bottom of the cyclone. Meanwhile, the lighter air which can turn as required by the flow constraint of the wall, typically accumulates towards the center, and rises out the top of the cyclone.

Centrifugal separators, in which the entire cylinder of the centrifuge is rotating, may similarly by used for separating out species, whether the species are gases in liquids, liquids in liquids, liquids in gases, gases in gases, liquids in solids, or solids in liquids. Thus, in general, whether single phase or multi-phase, centrifugal separators may migrate a heavier species toward an outer wall of a spinning chamber, while migrating a lighter, lower-density species toward the center. Typically, the ability to control the speed or angular rotational rate of a centrifuge allows virtually any acceleration (number of g's) that can be engineered into the rotating structure and its drive mechanisms.

Continuous centrifugal separators, typically require routine, stationary, highly invasive cleaning procedures. Just as sediment sinks to the bottom of a pond, heavier species, particularly solid matter, such as grit, waste, trace minerals, precipitates, and the like that are heavier than the principal fluid in which they dwell, will be driven toward an outer wall. They may or may not be entrained to exit with the heavier species.

Thus, the accumulation of a certain amount of undesirable debris against an outer wall is common. The common solution is to periodically cease operations, dismantle the centrifuge, and clean or replace components that have accumulated the waste products. Moreover, inasmuch as precipitates, grit, and other solids tend to be abrasive, parts may require replacement on a regular basis, due to abrasive deterioration.

Industrial centrifuges, and particularly continuous centrifugal separators, are the bane of maintenance engineering and staff in an industrial plant. They tend to be maintenance intensive. The maintenance requires skill, down time, service time, re-work time, as well as tools, cleaning equipment, parts inventory, and so forth.

It would be an advance in the art to be able to provide a self-cleaning, centrifugal separator. It would be a further advance in the art to provide effective dynamic cleaning, not having to shut down operation of a continuous centrifugal separator. It would also be an advance in the art to provide mechanisms in a continuous centrifugal separator to minimize accumulation of waste products, to test in some way the operational characteristics of a continuous centrifugal separator, to test certain fluid properties of materials entering and exiting such a separator, to assess condition, schedule maintenance, and schedule routine dynamic cleaning, static cleaning, or the like.

In the prior art, it is common understanding that continuous centrifugal separators are unable to process variable flow rates, or tolerate substantial variation in the constituents of an incoming (influent) stream. They are unable to move off their operational design point to change feed ratios, back pressures, or the like on the flow streams exiting. Rather, systems are engineered, set up, and operated as open-loop systems in which conditions of the equipment, materials processed, or both are not fed back to alter the operational characteristics of the system or process. Thus, it would be an advance in the art to improve any or all of these limitations on continuous centrifugal separators. It would be a further advance in the art to provide a precise and effective control mechanism for controlling operation of a continuous centrifugal separator Two operational characteristics of a centrifuge are the rotational (angular) velocity and flow rate. Angular Velocity may be written in terms of revolutions per minute, revolutions per second, radians per second, or the like. Typically, a centrifuge is built to operate at a particular design frequency, the rotational speed as revolutions per minute. Many centrifuges are not operated at any significantly degraded frequency.

Moreover, the flow rate through a centrifuge is also a matter of engineering design. Typically, the volumetric flow rate or mass flow rate through a centrifuge is a design characteristic engineered to match the rotational speed or angular velocity of the centrifuge. The turn down ratio of a volumetric flow rate or mass flow rate is the ratio calculated as the value of a reduced set point, divided by the design set point for volumetric flow rate. That ratio permissible is conventionally extremely limited.

For example, turn down ratios for volumetric flow rate are typically not less than about seventy percent. That is, volumetric flow rate may not be turned down more than about thirty percent, leaving a net throughput of about seventy percent of the original design rated value.

It would be an advance in the art to design a centrifuge system and a design process by which a continuous centrifugal separator could be operated off the specified nominal design parameters, at a wide range of turn down ratios. Thus, it would be an advance in the art to provide a system tolerating longer residence times of fluids passing through the separator, thus providing a better control of the "cut" in response to changes in influent feed stock or the like.

BRIEF SUMMARY OF THE INVENTION

In view of the foregoing, in accordance with the invention as embodied and broadly described herein, a method and apparatus are disclosed in one embodiment of the present invention as including angled influent tubes, vectoring flow into a rotating shell in order to create a laminar, annular, velocity distribution (LAVD) of flow in an axial direction along the continuous centrifugal separator. Likewise, diffuser (or diffusion) plates also generate a velocity profile consistent with LAVD. Multiple diffusers assure that Reynolds numbers remain well below turbulence (are stably laminar) within the flow throughout the continuous centrifugal separator (CCS). In the diffuser plates, apertures strip out eddies by having suitable effective diameters (hydraulic diameter, where hydraulic diameter is four times the area divided by the wetted perimeter).

The LAVD in the CCS provides a Reynolds number having a value in the range of about one thousand or less. The Reynolds number is a well documented, dimensionless number useful in characterizing fluid flows. It is the density of a moving fluid multiplied by the velocity and a significant length, such as a diameter, all divided by the viscosity of the fluid. The system is also designed to provide an apparatus and method for dynamic cleaning while an outer housing or rotor shell is rotating.

Moreover, a trapezoidal cross-section along an axial radial plane may be thought of as a directrix sweeping out a trapezoid of rotation wherein the base of the trapezoid is at the exit (effluent) end of the CCS. Thus, in dynamic cleaning, precipitates, accumulations of other debris, and the like are hydrated by entrainment jets to migrate toward the outer wall, at a greater radius. They thus migrate axially as well, along the inside surface of the outer wall of the rotor shell in order to be drained out through various available mechanisms.

Those available mechanisms include dynamically draining with the heavier, separated fluid species. Also, stationary cleaning drains may be accessed during static cleaning. Stationary or static cleaning is available using many shared equipment devices, but absent rotation of the rotor shell.

In a system and method in accordance with the invention, the cleaning frequency of both a dynamic flush and a static flush cleaning may be governed, and cleaning conducted both on a continuing, frequency-based schedule, as well as on a need basis. For example, sensors, feedback, and tracking may be used for turbidity, processed fluids in, and vibration within the CCS. All may be used in computerized programs to assess the need for cleaning in order to maintain performance.

In certain embodiments, a dispersion band may be optimized for location within the rotor shell. For example, the dispersion band may be thought of as a thin-walled cylinder of dispersed (unseparated) multiple species of fluid existing about a radius measured from the axis of rotation of the rotor shell. The dispersion band narrows axially, beginning at the inlet or influent end of the CCS, reducing at the outlet end of the CCS to a virtual surface or boundary between the heavier species and lighter species being separated from one another in the CCS.

A coalescing (or coalescence) plate near the outlet effluent end of the CCS assists in coalescing the dispersed on unseparated species present in the least volume of the dispersion band. For example, a coalescing plate assisting in separating dispersed oil out of water will be hydrophobic and oleophilic. In contrast, if dispersed water is to be separated from a bulk oil, it may rely on a coalescing plate made hydrophilic and oleophobic.

In general, a continuous centrifugal separator (CCS) may have a control mechanism programmatically controlling output, adjusting to influents, compensating for temperature, tracking turbidity and vibration, scheduling dynamic and static cleaning, and otherwise providing optimized operation. Meanwhile, the system provides specific mechanisms to minimize turbulent intensity throughout and favor a laminar, annular, velocity distribution (LAVD) throughout the system.

In certain embodiments of an apparatus and method in accordance with the invention, a process may include intake of an influent. The influent may be maintained in an LAVD condition. Thereafter, a staged axial distribution process may assure that the axial distribution of fluid inlets is consistent with the LAVD condition. Meanwhile, a staged radial distribution introduces fluids at different radii to support the LAVD in the CCS.

Development of an LAVD shell flow assists in providing the proper velocity profile, at a properly low Reynolds number to assure stable, laminar flow. Thereupon, stripping eddies out of the system may be done one or more times through appropriate steps such as passing through orifices of sufficiently small hydraulic diameter. Thereafter, stabilizing the LAVD profile may be accomplished by control of the Reynolds number and flow rates.

Establishing a dispersion band may occur at any point after the inlet, but accelerates following the stripping of eddies. After stabilization of the LAVD developing the band will narrow its radial extent (thickness) from its inner radius to its outer radius. Ultimately stagnation of the dispersion band flow occurs at a coalescence plate.

For example, a mixture of both fluid species to be separated, exists primarily in the dispersion band. Contrary to prior art systems, an apparatus and method in accordance with the invention may fully stagnate the band flow (the flow of material in the dispersion band) at a coalescing plate. That coalescing plate, or coalescence plate, forces the axial flow of fluid in the dispersion band to stagnate, come to a complete halt in its axial progress. Dispersed droplets spread out along the coalescence plate, thereby urging a disruption of the geometry of the separating constituents.

Smearing and flattening droplets out of their spherical shape is effective in assisting in coalescence of each species of droplet with its own species of separated fluid. Thus, immediately following stagnation, smearing of the droplets against the coalescence plate creates a film, in which the now deformed or smeared droplets coalesce into a film along the plate, adhering in the case of the one (e.g., oil) species, and separating away from the plate in the case of the other (e.g., water) species. This refers to the oleophilic and hydrophobic condition. An opposite dispersion may, alternatively, use the oleophobic and hydrophilic property of a coalescence plate.

As each coalesced film combines with its own species, and separates to the inner or outer, fully separated flow with respect to the dispersion band, the species will each have the opportunity to exit through penetrations or apertures (perforations, orifices) in the coalescence plate. These apertures are spaced away from the central radial circle defining the central, target-radius location for impingement and stagnation by the dispersion band against the coalescence plate. The diameter of these apertures is selected to strip eddies from the flow, inasmuch as changes of direction tend to generate those eddies. Diameters less than diameters of eddies will stop circular motion and thus "strip" the eddies.

The perforations or apertures also provide for a flow and reduce the draw of fluid drag on the back side or downstream side of the coalescence plate. That is, the region of coalescence is indeed a plate. Accordingly, the direction of flow adjacent the dispersion band must virtually stagnate against and turn around the plate portion of the coalescence plate. Eventually progressing around the edge thereof, as if passed across an orifice, the redirected flow must then rejoin the main axial flow and re-establish LAVD flow on the downstream side thereof. By providing the perforations, a certain draw and flow is provided through to the downstream face, thus reducing the pressure drop or pressure reduction behind the coalescence plate.

Maintenance of Reynolds numbers of stably laminar flow assures absorption of radial momentum imposed by the coalescence plate and passage through apertures (large gaps at radii less than and greater than that of the coalescence region). The gaps assure axial, laminar, annular bulk flow.

Ultimately, in the region downstream from the coalescence plate, a quiescent, divided region exists. The dispersion band has preferably reduced to a surface of interface between the heavier species and lighter species. The species with higher density will exist in the region of comparatively larger radius within the rotor shell.

Typically, the lighter species may be drawn off by flowing through an aperture into a tube or annulus in a shaft surrounding the central axis of rotation in the rotor shell. Meanwhile, a standoff as an outlet tube may extend from proximate the rotor shell, radially inward, to penetrate and feed into a different annulus or tube in the shaft.

Ultimately, a pressure head or pressure differential develops due to the density difference between the net column of heavier species in the standoff tube, compared to the effective density of the radial column within the rotor shell itself. The heavier species is in the region at a comparatively larger radial distance. The lighter species is in the region of lesser radial distance in the rotor shell. The standoff or outlet tube contains only the heavier species. This difference provides a pressure differential. That pressure differential is monitored, and used to identify and control the specific location of the dispersion band. That band forms the boundary between the heavier species and lighter species.

In an alternative embodiment, openings may be made in a wall of the rotor shell, either the outer surface of the rotor shell itself, or in the lid or end cap that seals the opening at the larger end (effluent end, terminal end) of the rotor shell. Thus, any conduit transporting the heavier fluid may be positioned within the shell or outside the shell. Regardless, it will typically be required to pass into an exit column, whether annular or tubular, within the rotating shaft space of the CCS.

Ultimately, an optimization process may be included as a step of the overall fluid treatment process in accordance with the invention. For example, it has been found that a volumetric flow rate may be set, and a sensitivity analysis may be conducted with the system online and operating, at various rotational velocities. In a mathematical sense, an influent space may be thought of as a set of graphs or a series of graphs defining a multi-dimensional mathematical space. That space may extend in multiple variables to define a surface. That surface may be viewed as including or being susceptible to penetration by planes each plane representing a fixed value of a particular volumetric flow rate or mass flow rate.

A dependent, effluent, performance variable (fluid condition) may be evaluated at a specific volumetric flow rate, according to its change with rotational of velocity of the rotor shell. Thus, a minimum may be detected. By observing the first and second derivatives of that curve of fluid condition as a function of a particular independent performance variable, one may find an optimum. By progressing through multiple planes or various planes corresponding to different flow rates, a local surface minimum may be located.

Meanwhile, within an influent space, that is, for any particular influent constituents and overall constitution (materials and fractions), such a space may be defined, and operated within. For example, turbidity, pressure head differential between effluent species, volumetric flow rate, temperature, density, concentration of any particular constituent, or the like may be considered as an effluent fluid condition.

An effluent fluid condition (dependent variable) may be thought of as existing on a y axis of a graph. Meanwhile, extrinsic, independent, performance variables may be represented on the x axis of the graph. Thus, rotational of velocity and the like may be varied as the independent or x variable in such a chart.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
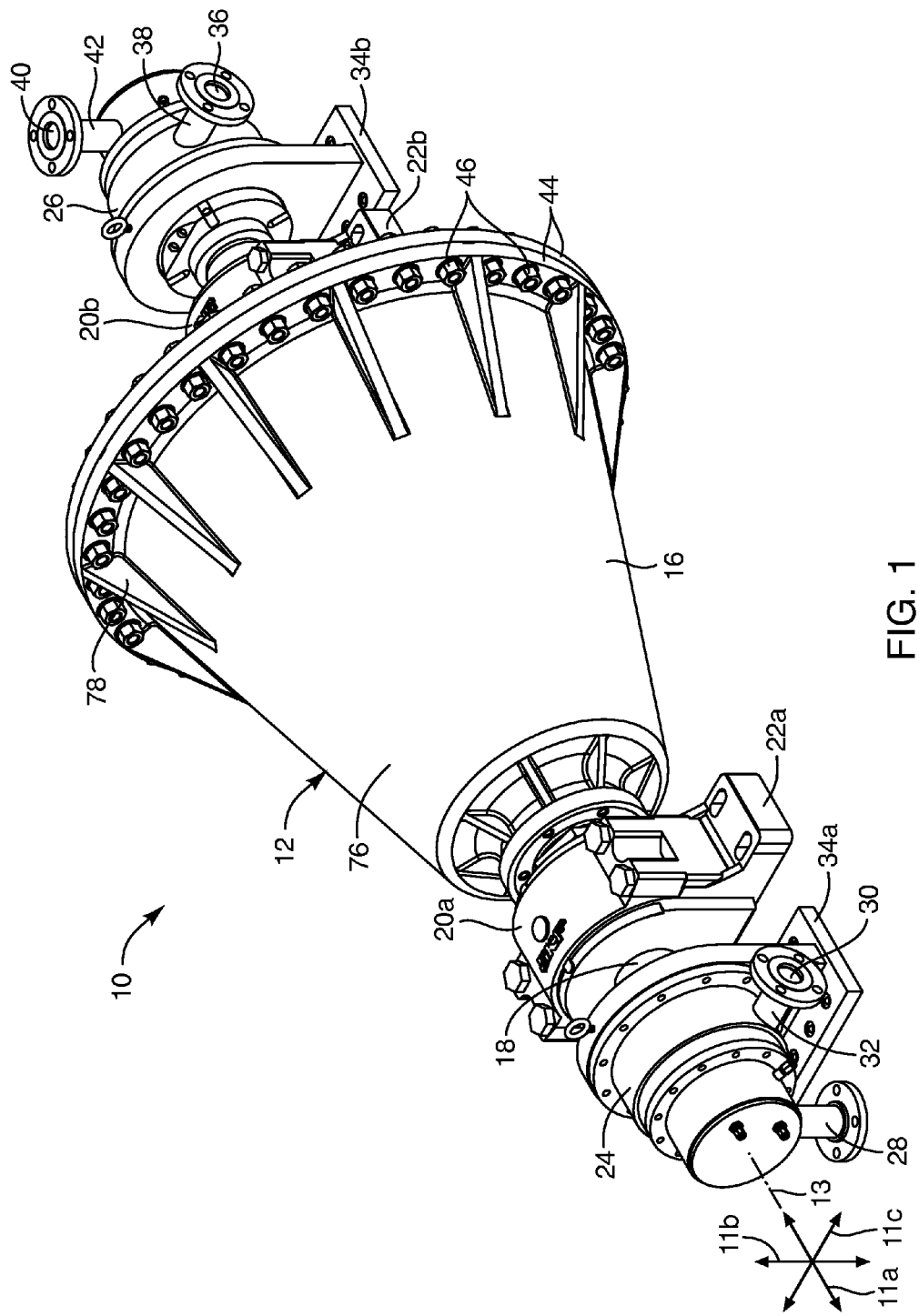
FIG. 1 is a perspective view of a continuous centrifugal separator (CCS) system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-6, in conjunction with FIGS. 1-19 generally, a system 10 in accordance with the invention may define an axial direction 11$a$, vertical direction 11$b$, and lateral direction 11$c$, which together may also represent an axial direction 11$a$ and a radial direction 11$b$. That is, directions 11$b$, 11$c$ are radial directions with respect to a centrifuge 12 rotating about a central axis 13. The centrifuge 12 may be thought of as a continuous, centrifugal separator system or CCS system. The central axis 13 is the axis of rotation 13. A motor 14 may be operably connected to the centrifuge 12 (ccs12) in order to maintain a specified angular velocity or number of rotations per minute (or radians at two Pi radians per revolution).

In the illustrated embodiment, a radius 15 may be defined with respect to the central axis 13. Thus, any location within the entire system 10 may be defined by its particular radius 15. Typically, the centrifuge 12 (ccs12) is constituted by a shell 16 or rotor shell 16 that operates as a rotor, rotating about a central axis 13, and typically rotating on a shaft 18. Portions of the shaft 18, or the entire shaft 18, may rotate in fixed relation with respect to the rotor shell 16, on bearings 20. For example, the bearings 20$a$, 20$b$, refer to bearings 20 at opposite ends of the system 10.

Herein, any use of a reference numeral, absent trailing letters refers to that item generally. However, using the same reference numeral, with a trailing letter, refers to a specific instance of the item identified by the numeral. Thus, hereinafter, one may refer to an item by number, number and letter, or both as appropriate to the context.

Typically, the shaft 18, operating in a system of bearings 20 may fix to a mount 22 that itself will be comparatively rigidly fixed with respect to the earth. For example, concrete buttresses, footings, other super structures, and the like built on the floor of a plant, in an outdoor facility, on a mobile unit, such as a trailer or truck, or the like may support the mounts 22, fixed thereto. In turn, the mounts 22$a$, 22$b$ hold the respective sets of bearings 20$a$, 20$b$ in which the shaft 18 rotates as it carries the shell 16.

In the illustrated embodiment, a hub 24 or influent hub 24 may contain slip rings, seals, and the like in order to introduce effluent from a fixed line into the rotating machinery of the system 10. Likewise, a hub 26 or effluent hub 26 at the opposite end of the system 10 may have sealing, changes in direction or motion, connectors such as slip rings, and the like, in order to provide an outflow effluent of the separated constituents from the CCS 12.

An inlet 28 may receive a flush fluid. For example, cleaning may be done online, while rotating the CCS 12. In such an embodiment, an inlet 28 may receive a flush fluid, to be jetted against the inside surface 74 of the outer wall of the rotor shell 16. This breaks up particulate matter and other deposits urged by rotation and by liquid sweeping toward the effluent end of the CCS 12.

Likewise, an inlet 30 for the influent passes into the shaft 18, which operates as both a mechanical axle 18 for the rotor shell 16, as well as containing a conduit 54 (lumen 54) and annulus 56 (lumen 56) for the inlet 28 and the inlet 30, the latter to pass the mixture into the rotor shell 16 to be separated.

An influent line 32 defines, to a certain extent, the inlet 30. Meanwhile, mounts 34, such as the mounts 34*a*, 34*b* may support the fixation of the inlets 28, 30 with respect to incoming lines providing the respective feeds thereinto.

Typically, a bulk flow 35 may pass into the fluid hub 24, to eventually pass through the rotor shell 16. Typically, the bulk flow 35 is axial, with a migration of species toward different radii from and separated by a dispersion band 120. The heavier is the outermost material, and the lighter is the innermost material. Accordingly, an outlet 36 for the heavier species may be mounted on a stand pipe 66 (standoff 66) or pick-up tube 66 receiving fluid proximate the rotor shell 16.

In other embodiments, a port may be provided as an outlet 36 in the lid 80, or the shell 16. Fluid may then be conducted in a conduit back toward the appropriate line or passage within the shaft 18. In the illustrated embodiment, the outlet 36 for the heavier species is inside the rotor shell 16, at the distal end of the tube 66, at the greatest radius thereof from the central axis 13. Meanwhile, a line 38 conducts the heavy species or the comparatively heavier species out of the hub 26, and to a particular containment or post processing location.

The outlet 40 closer to the central axis 13, may be serviced simply by a port 68 bored through a wall of the shaft 18, thereby accessing a tube 70 and passage 71 to receive and conduct the lighter species from the CCS 12. Typically, a line 42 eventually receives the lighter species exiting the system 10. Each of the lines 38, 42 may be equipped with flanges 44, in order to connect to further conduits, each line 38, 42, defining an outlet 36, 40, respectively for the heavy and light species, respectively.

In the illustrated embodiment, flanges 44 may be provided on a rotor shell 16 and lid 80 to secure each to the other for operational integrity. Various seals may be used to effect a fluid-proof containment. Fasteners 46 may be applied at a distance, size, and at a torque designed to maintain the proper seal pressures between the rotor shell 16 and the lid 80.

Figure 2:
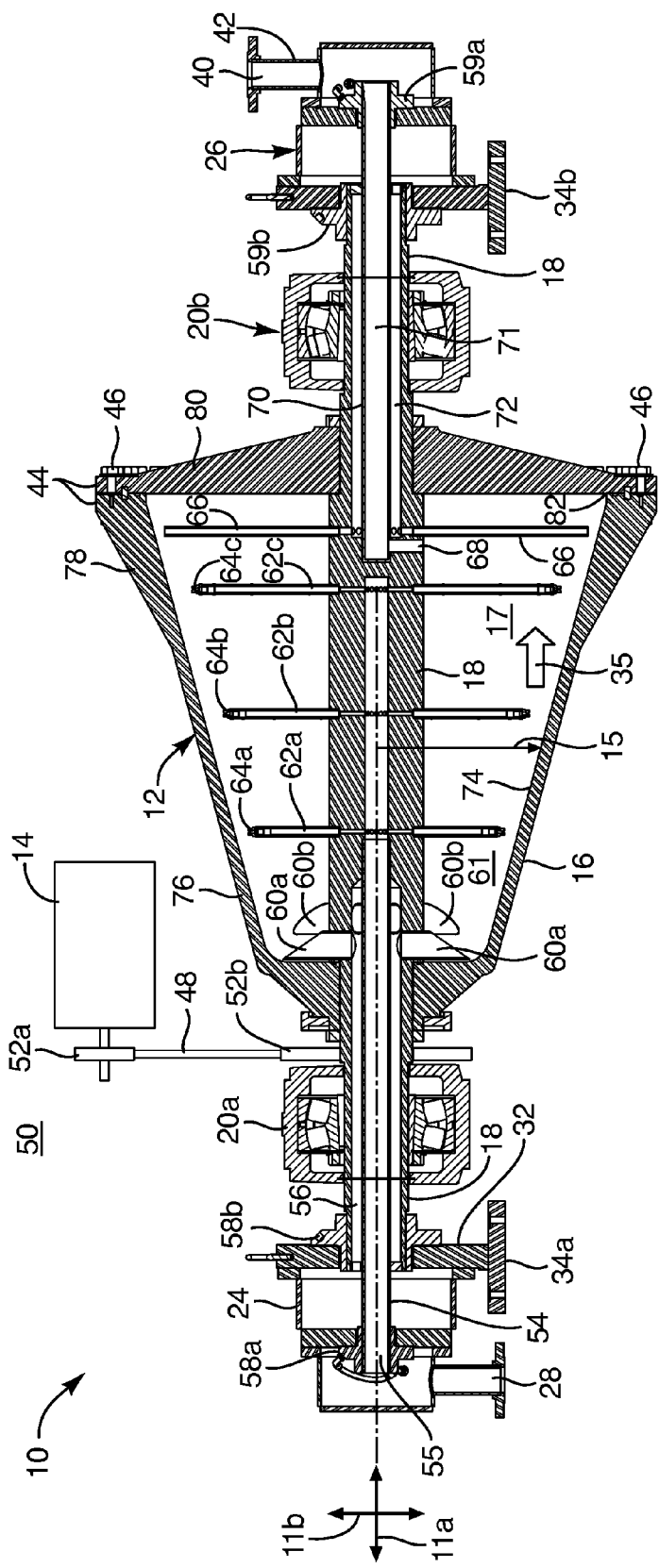
FIG. 2 is a radial (side) elevation, cross-sectional view thereof.

Referring to FIG. 2, as well as FIGS. 1-10 while continuing to refer generally to FIGS. 1-19, a CCS 12 implemented in a system 10 in accordance with the invention may include a drive 48, such as a drive belt 48, as part of an overall drive system 50 through various gears, pulleys 52, or the like. For example, pulleys 52*a*, 52*b* may provide for driving by a motor 14 rotating the centrifuge 12 or CCS 12. The operational controls on the drive system 50 may be in accordance with suitable systems known in the art in order to provide rotational velocity control, and feedback.

In the illustrated embodiment, various tubes 54 as flush tubes 54 may extend from the shaft 18 into the cavity 17. The tube 54 may feed from a lumen 55 passing through the shaft 18. The central tube 54 in the shaft 18 defines the lumen 55 receiving the flush fluid to be passed into the shell 16 or rotor 16 for cleaning thereof.

Typically, the influent flow passes through a lumen 56 maybe configured as an annulus 56. Meanwhile, the influent material to be separated, is a mixture of multiple species to be divided out by the CCS 12. It passes through the annulus 56 formed between the tube 54, and the outer extremities of the shaft 18.

Typically, mechanical seals 58 at the influent end, embodied herein as seals 58*a*, 58*b* as well as the seals 59 at the effluent end, embodied as the seals 59*a* and 59*b*, seal the rotating tubes 54, 70 and shaft 18, respectively, against the escape of fluids. For example, the hubs 24, 26 may exchange fluids between the shaft 18 and fixed lines 28, 42. The seals 58, 59 seal against leakage of fluid, and thus become rotating seals, or slip rings effectively, to seal the rotating shaft 18 and its passages 55, 56 against leakage. Stated another way, the seals 58, 59, embodied as seals 58*a*, 58*b* and 59*a*, 59*b*, seal the tube 54 and shaft 18, in order to close off against leakage from the lumens 55, 56.

Influent tubes 60 introduce the mixture that is to be separated into the internal cavity 17 of the rotor shell 16. The influent tubes 60 are distributed axially, radially, and circumferentially. Radially different lengths have different individual diameters. The influent tubes 60 are also distributed axially. The tubes 60*a*, axially closest to the incoming wall are shorter, and have a smaller diameter. The tubes 60*b*, spaced farther from that incoming wall are longer, and have a larger diameter. The tubes 60*a* closest to the inner surface and having shorter length provide for earlier distribution of influent liquid into the cavity 17 of the rotor shell 16. Meanwhile, the influent tubes 60*b* extending further out to a larger distance or radius 15 from the central axis 13 deliver fluid at that larger radius, assisting to direct the flow along the axial direction 11*a* through the cavity 17.

In general, the cavity 17 may include a portion 61 or plenum 61 that receives the two arrays of influent tubes 60*a*, 60*b*. The shorter and axially first tubes 60*a* are typically four in number, radially of the same dimensions as one another, each having an angled exit to promote an axial flow while distributing the flow radially into the plenum 61. Meanwhile, the influent tubes 60*b* are clocked (circumferentially offset) to be exactly out of phase circumferentially from the tubes 60*a*, for, a total of eight tubes 60 in this illustrated embodiment.

The diameters inside each of the tubes 60*a* are the same. The diameters of the tubes 60*b* are all the same. The diameters of the tubes 60*a* differ from those of the tubes 60*b*. The size of the inside diameter, as well as the angle of the cut for the diagonal output or outlet end of each of the tubes 60*a*, 60*b* is also an engineered value. The lengths of the tubes 60*a*, 60*b* are engineered values based on fluid parameters as discussed herein.

A valuable objective is to maintain a laminar, annular, velocity distribution throughout the plenum 61 and the entire cavity 17. Thus, by staged axial distribution, the tubes 60 provide influent staged in the axial direction, introduced in a laminar flow. Similarly, by staged radial distribution, the introduction of influent at different radii by the tubes 60*a*, 60*b* provides a distribution across the radius or the radii of the plenum 61. Moreover, a uniform circumferential distribution of both flows emanates from the sets of tubes 60*a*, 60*b*. Accordingly, prior to entry into the main region of the cavity 17 of the rotor shell 16, the flow in the plenum 61 is already developed into an LAVD profile.

During cleaning, the lumen 55 feeds a cleaning liquid or flushing liquid into flush tubes 62 in fluid communication therewith. In the illustrated embodiment, three banks of flush tubes 62a, 62b, 62c are illustrated. More or fewer may be used. However, the illustrated embodiment has been found to operate suitably in view of the need to occasionally disrupt the "fluid boundary layer" (as used in fluid mechanics) surrounding accumulated deposits on the inside surface 74 of the rotor shell 16.

To that end, each flush tube 62a, 62b, 62c is equipped at the distal end thereof with a nozzle 64a, 64b, 64c, respectively. The nozzles 64 are not spray nozzles. Rather, each of the nozzles 64a, 64b, 64c is responsible for forming an entrainment jet that operates as an impingement jet directed against the surface 74 of the rotor shell 16. The details of operation thereof will be discussed hereinbelow.

The standoff 66 or exit tube 66 for the heavier species being separated by the CCS 12 is illustrated as the tube 66. Typically, such a tube 66 must feed out of the cavity 17 of the rotor shell 16, receiving at the distal end of both the heavier, separated liquid. Thus, the tube 66 conducts that heavier species inward toward the shaft 18, depositing it in the annulus 72 for discharge. Meanwhile, the port is an outlet port 68 for the lighter species. A bore 68, directed radially through the wall of the shaft 18, contacts the lumen 71, discharging the lighter species.

The roles of the annulus 72, or lumen 72 defined by the annulus 72, and the outlet tube 70 defining the lumen 71 may be reversed. Nevertheless, it has been found effective and manufacturable, to permit the lighter species to exit through the port 68, into the lumen 71 central to the tube 70 in the shaft 18. Thereby, the lighter species may be conducted directly through the wall of the shaft 18 to the annulus 72 or lumen 72 external to the tube 70.

The flush tube nozzles 64 as well as the pickup tube 66 or heavy effluent pick up tube 66 are spaced comparatively closely (e.g., within about an inch, 2.5 cm) to the surface 74 of the rotor shell 16. The flush tubes 62 need to be close to the surface 74. It is important for their effectiveness that they direct an entrainment jet with sufficient velocity and momentum to disrupt and entrain surface deposits lying against the surface 74. On the other hand, the feed tube 66 or pick up tube 66 need only be well established within the cavity 17, in the region of the heavier species. Nevertheless, closer to the surface 74 will typically be better. Moreover, near the wall surface 74 deposits from the wall surface 74 are inducted into the tube 66 during a dynamic flush.

The rotor shell 16 may be reinforced by gussets 78 proximate the effluent end thereof. In the illustrated embodiment, the rotor shell 16 is configured to have a trapezoidal cross-section when viewed orthogonally with respect to a vertical or horizontal plane. The cross-section of the rotor shell 16, and particularly the cavity 17 is trapezoidal, a trapezoid of revolution. This assists in driving waste deposits flushed from the surface 74 in an axial direction toward the effluent end of the cavity 17 due to Vector resolution of centripetal forces.

Also, the bulk flow 35 of the fluid in the cavity 17 is from the influent end toward the effluent end the trapezoidal shape of the cavity 17 urges the heavier solids as suspended particulates to the maximum radius 15 possible, which urges them along the trapezoid toward a vertex 82 where the lid 80 or cap 80 seals the shell 16, at the surface 74. Thus, axial and radial migration of solid materials is urged by the rotational angular velocity, and consequent centrifugal action urging those particulates, out of suspension, along the surface 74, and toward the vertex 82.

Figure 3:
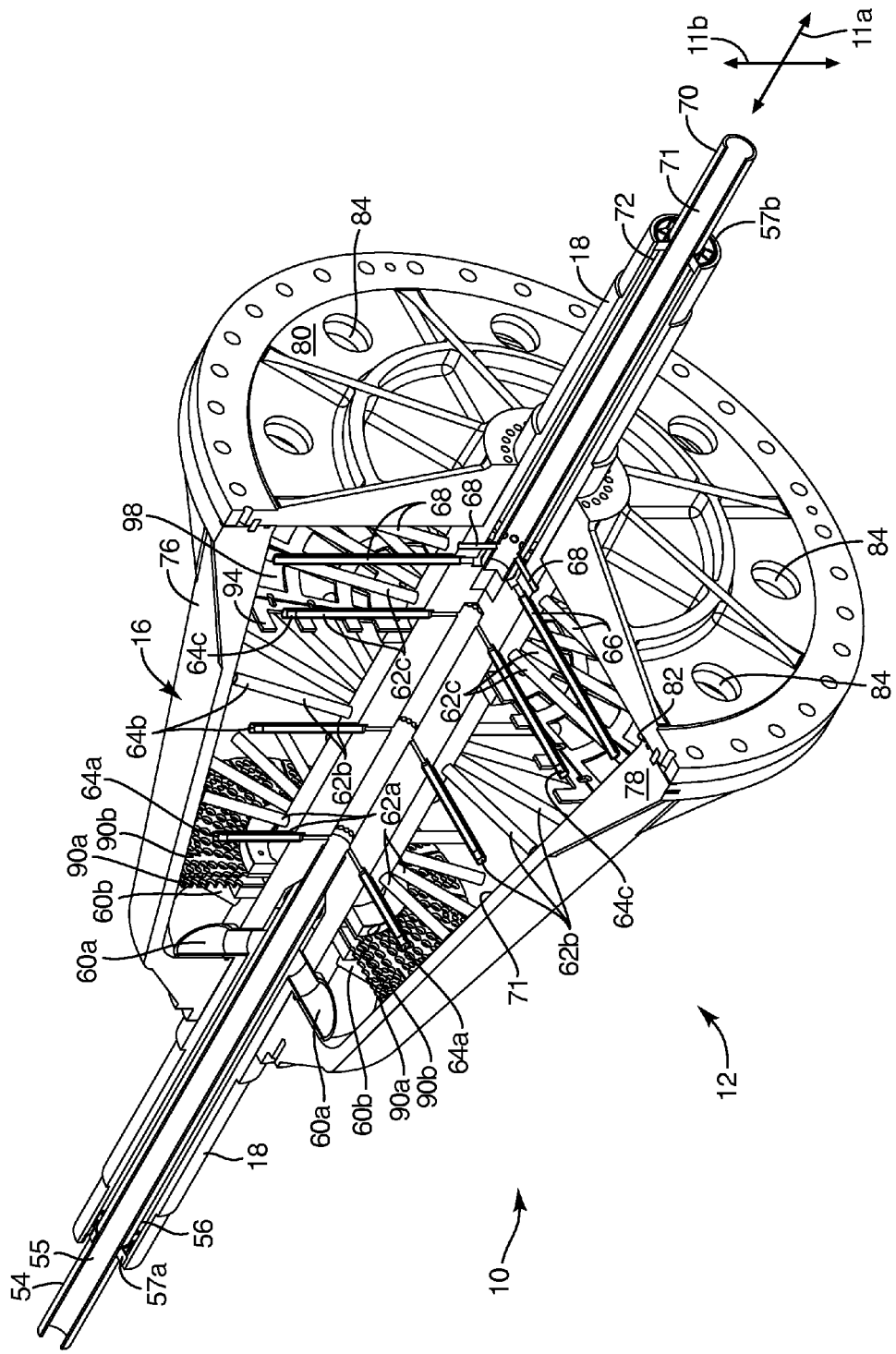
FIG. 3 is an effluent end, perspective, partially cut-away view thereof, absent certain supporting equipment and internal fins.
Figure 4:
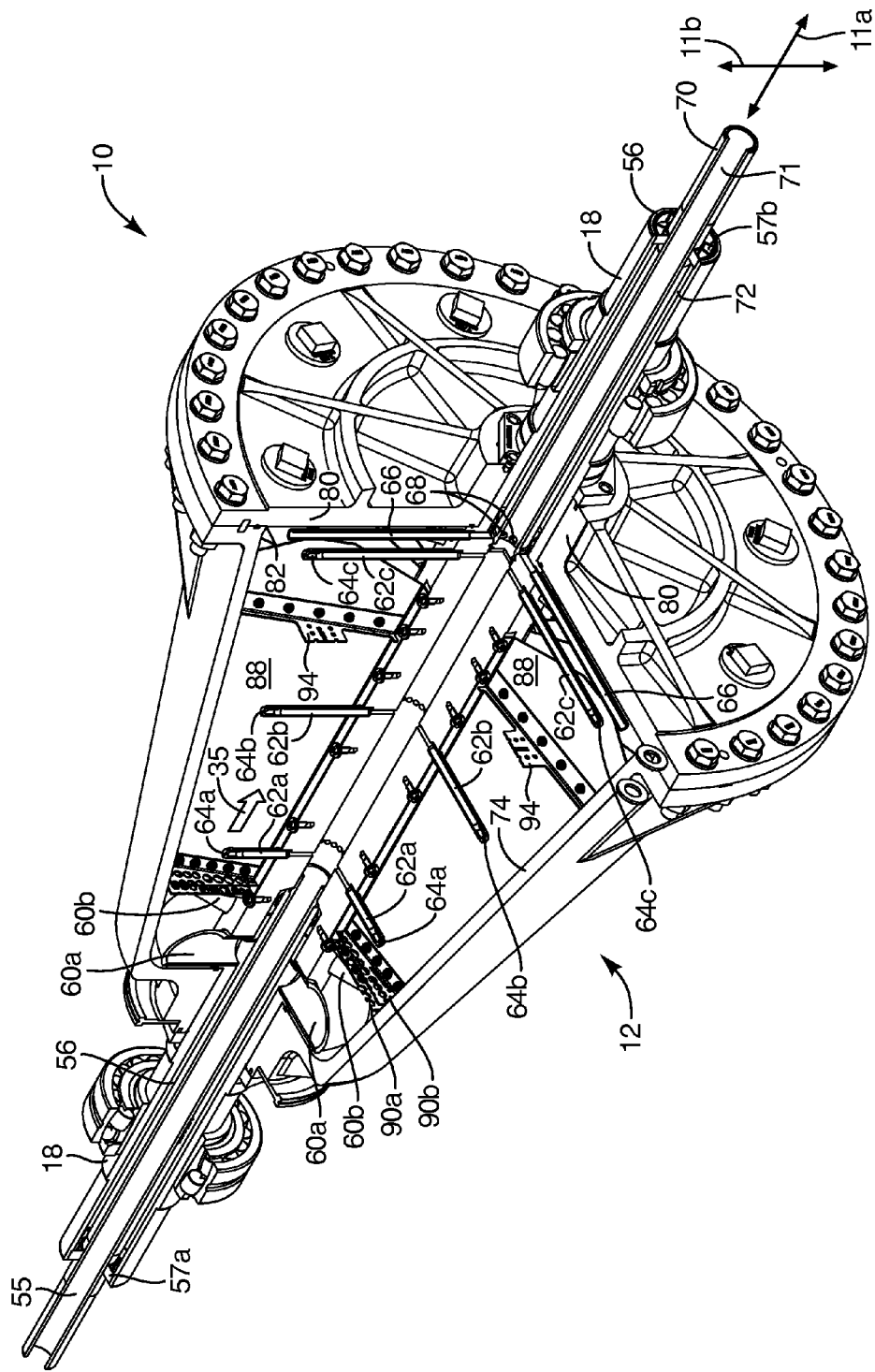
FIG. 4 is a perspective, partially cut-away view thereof, with fins in place.
Figure 5:
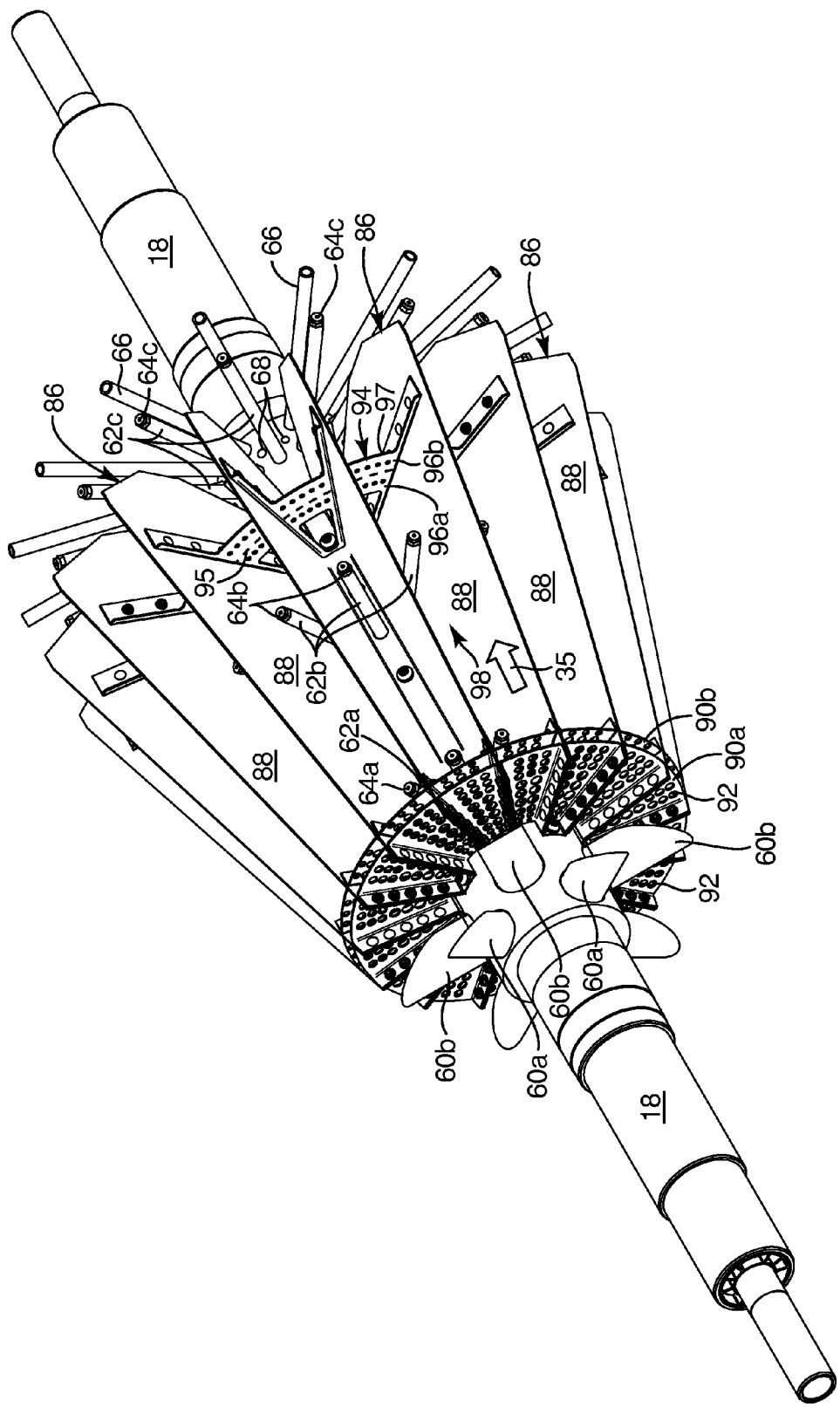
FIG. 5 is a perspective view of fin packs of FIG. 4 removed from the shell and viewed from the influent end.

Referring to FIG. 3, as well was FIGS. 1-10, while continuing to refer generally to FIGS. 1-19, the shell 16 may be capped with a lid 80 or cap 80 acting as a closure 80 at the effluent end of the CCS 12. In the illustrated embodiment, the inner surface 74 of the shell 16 creates a vertex 82 at the intersection with the lid 80 or cover 80. This is the location to which solid materials, such as precipitates, coatings, and other debris tend to travel along the inside surface 74 of the shell 16 when disrupted by jets from the nozzles 64 on the flush tubes 62. An accumulation of such debris near the pickup tube 66 is entrained and carried by the heavy species entering the tube 66 during a dynamic flush.

However, drains 84 are provided in the cap 80 in the illustrated embodiment. The drains 84 are engineered and manufactured to allow freedom from obstruction, and the free exit of fluids, solids, or a combination thereof out through the drains 84, at the vertex 82. Notwithstanding the appearance of the vertex 82 as a corner, it is a circle of intersection between the lid 80, and the rotor shell 16.

During a static flush operation, the rotor shell 16 is not spinning at operational speeds. It may be rotated manually as appropriate to flush and drain debris out through the drains 84. Moreover, nozzles and various chemical, heat, or other cleaning agents may be inserted through a drain 84 to effect static cleaning.

After cleaning, each of the drains 84 may be closed with an appropriate stopper. A threaded fitting provided with a seal may assure the resistance to flow at the large effective accelerations and consequent static pressures exerted at the location of the drains 84.

Referring to FIGS. 3-9, while continuing to refer generally to FIGS. 1-19, inside the rotor shell 16 are provided numerous components, each with its respective functionality to effect operation of the CCS 12. Components within the rotor shell 16 are secured to some portion of the shaft 18. One value for securing components to the shaft 18 is to provide as smooth and unobstructed a path as reasonably possible along the surface 74 or inner surface 74 of the shell 16. Thus, the bulk flow 35 within the cavity 17, will have a minimum of interference, turbulence, and thickness of fluid boundary layer against that surface 74.

For example, the outer surface 76 on the outside of the shell 16 rotates in air. Similarly, it has no particular fluid dynamic limitations. The gussets 78 effectively are fins. Nevertheless, the structural integrity of the shell 16 under the pressures induced by the centrifugal forces benefits from the reinforcement of the gussets 78.

No gussets 78 are used on the inside surface 74 of the shell 16. They could effectively be placed there, from a structural perspective. However, from a fluid dynamics perspective, minimizing obstructions, and providing for a continuous, smooth, uninterrupted surface 74 provides a minimum boundary layer, the minimum accumulation of debris, and so forth.

In the illustrated embodiment, the central tube 54 and the shaft 18 form therebetween an annulus 56. Likewise fit together the tube 70 and shaft 18 to form the annulus 72. Between each of the tubes 54, 70 and the shaft 18 are placed registers 57. A register 57a may be placed between the influent tube 54 and the shaft 18 in order to provide the influent annulus registration distance. The register 57 may be constructed to appear like a wheel having spokes. Each spoke extends radially outward from near the center, or from the rim on the tube 54 to a rim against the shaft 18.

At the opposite effluent, end of the CCS, the central (outlet) tube 70, containing the lumen 71 for lighter constituents, is registered by register 57b with respect to the shaft 18. Thus, a lumen 72 or annulus 72 is established by the register 57b spacing apart the outlet tube 70 and the shaft 18.

In currently contemplated embodiments, the spoke portion of each register 57 is hydrodynamically formed as a foil to minimize disruption of the flow, minimize eddies, and promote laminar flow. At the effluent end of the CCS 12, the laminarity of the flow is not crucial. In fact, it is not required by typical operating parameters. On the other hand, laminarity or a laminar flow in the influent annulus 56 is extremely valuable. Thus, the presence of the registers 57 operates not only as a structural spacer 57 or register 57, but also as a smoothing agent or hydrodynamic foil to urge and maintain axial, laminar flow in the annuli 56, 72.

In the illustrated embodiment, rectifier plates 90a, 90b may be formed in segments 97. For example, a fin pack 86 may define a central channel 87, a portion of the cavity 17. The channel 87 is bounded by fins 88 circumferentially spaced apart to define the channel 87. A back plate 89, hold together adjacent rectifier plates 90. Rectifier plates 90 may be placed comparatively closer to the influent end of the CCS 12, as the plate 90a, and farther away from the influent end as the plate 90b.

Other rectifier plates 90 may be added, but each comes with a benefit and a cost. Not only the cost of material, construction, complexity, differences in radius, and so forth, but a major point of the rectifier plates 90 is to strip out eddies (non-axial momentum), thereby establishing the laminar, annular, velocity distribution (LAVD) within the cavity 17.

The cavity 17 is effectively divided up into the individual channels 87 by the fins 88 of each fin pack 86. The back plate 89 is responsible to maintain structural relationships and spacing between the fins 88. Meanwhile, the plates 90 are each provided with apertures 92 as orifices 92. The design of the apertures is an engineered attempt at optimization to enforce, or rather promote, and maintain, the LAVD in the flow 35 through the main cavity 17. Hereinbelow, further details on the optimization of the LAVD by selection of aperture numbers, sizes, net open area, and relative position are discussed.

Meanwhile, another plate 94 may be thought of as a spacer 94, coalescence plate 94, or a combination. In certain embodiments, the plate 94 may be largely composed of gaps 98 (opening 98). These gaps 98 open up the channels 87 in the fin packs 86 to provide a maximum flow area at minimal disruption to the flow 35 through the cavity 17 of the rotor shell 16.

In certain embodiments, the coalescence plate 94 may be designed to include radial spokes leading to a stagnation portion sized to stagnate a dispersion band 120 thereagainst More will be discussed hereinbelow regarding the creation of a stagnation portion of the coalescence plate 94. The coalescence plate 94, if merely used as a spacer or stabilizer for the fin pack 86, may be formed of any suitable structural material.

Figure 7:
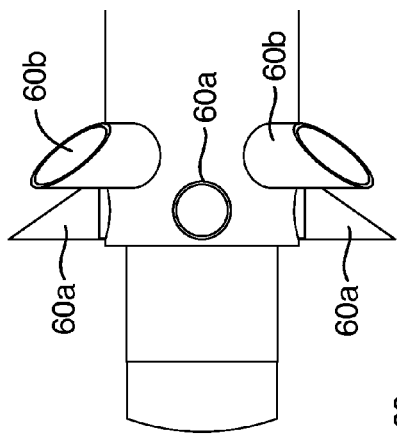
FIG. 7 is a side, elevation, close-up view of the influent tubes.
Figure 6:
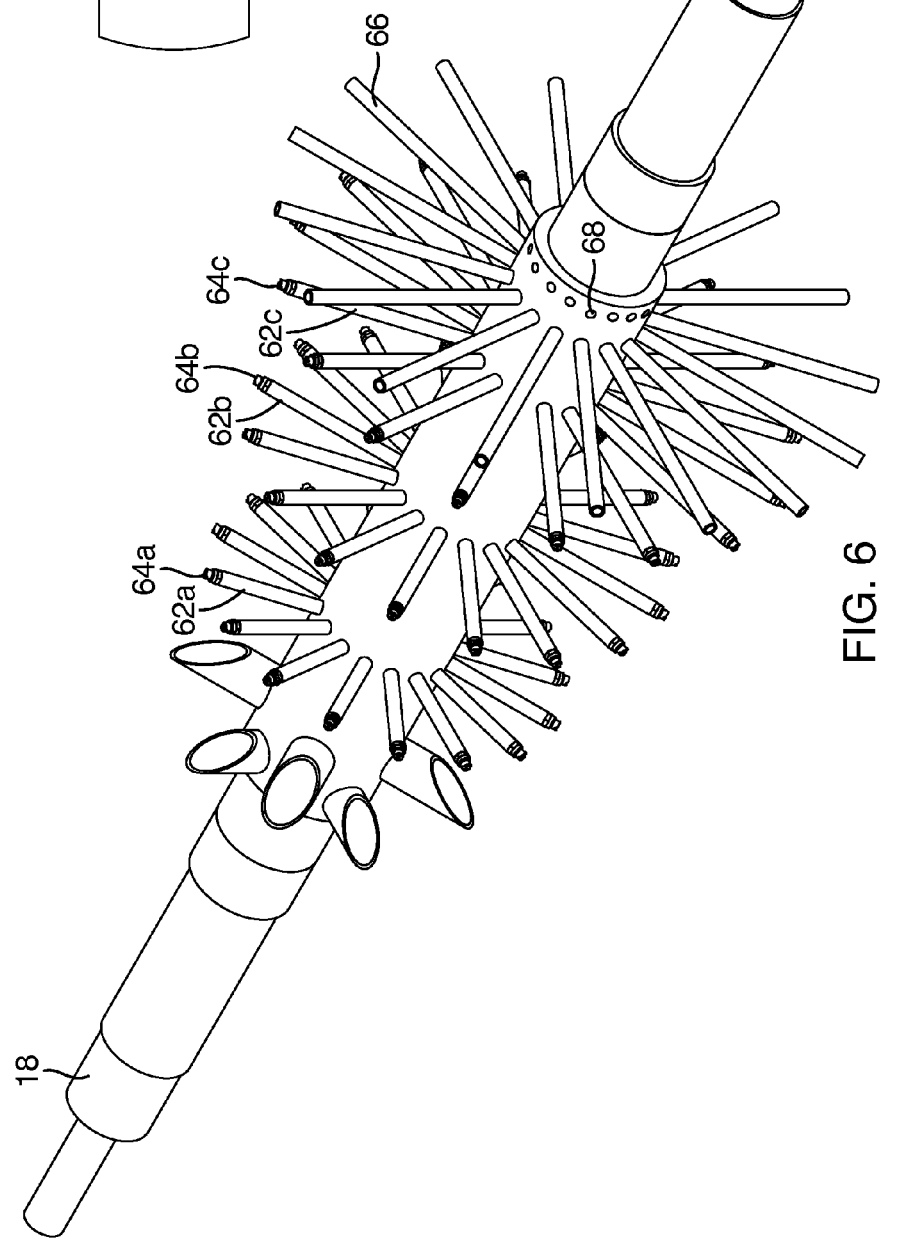
FIG. 6 is a perspective view of one embodiment of the central shaft of the system of FIGS. 1-6, with the influent and effluent outlet tubes in place, as well as the cleaning tubes.

Referring to FIGS. 6 and 7, (see also Figure 408) the shaft 18 is constructed to include multiple penetrations. Various tubes 60, 62, 66 are fastened, typically by threading into the shaft 18. The shaft 18 may be bored out, or otherwise formed in a tubular fashion to provide annuli 56, 72 near the influent end and effluent end, respectively. These annuli 56, 72 conduct the influent of mixed species and the effluent of separated species, respectively. The lumen 71 of the tube 70 positioned by the register 57b conducts one species of separated fluid, while the annulus 72 conducts the other. In the illustrated embodiment, the central lumen 71 carries the lighter species and the annulus 72 carries the heavier species.

At the influent end of the shaft 18, shell 16, the influent tubes 60a, 60b, are circumferentially illustrated as offset or clocked with respect to one another. The influent tubes 60a are set in an array of four tubes 60a, at a spacing of 90 degrees or ¼ circle from one another. The subsequent array of tubes 60b is set such that each tube 60b is clocked circumferentially out of phase with the adjacent tubes 60a by ⅛ of a turn, or 45 degrees.

Each of the influent tubes 60 has a length, and an angle at which it is cut on a diagonal at its output end. The flows from each influent tube 60 are capable of escaping at a shorter distance from the central axis 13 on the downstream side of each tube 60, compared with escape on the upstream side of each tube 60. This provides for momentum transfer with adjacent fluid and escape to travel in an axial direction 11a toward the effluent end more quickly during introduction into the cavity 17 of the shell 16.

Fluid closer to the upstream side of each tube continues contained by its respective tube 60 for a longer distance, and thus maintains more radial momentum than fluid on the opposite (downstream) side of the tube 60. Thus, the influent tubes 60 are extremely helpful in establishing a radial and axial uniformity prior to fluids reaching the rectifier plates 90.

The circumferential offset (clocking) provides a circumferential staging by distributing at multiple locations. The axial offset between the tubes 60a and tubes 60b yields a staged axial distribution. By virtue of the slanted cut engineered for each of the tubes 60, a staged radial distribution occurs. Thus, staging distribution in radial, axial, and circumferential directions assists in establishing a uniform distribution susceptible to development of the LAVD profile comparatively quickly, especially compared to prior art devices. Prior art systems investigated did not demonstrate any staged distribution in axial or radial directions. LAVD profiles were not developed and maintained.

Angled influent tubes 60a, 60b tend to vector flow into the cavity 17 of the shell 16. The longer tubes 60b have a larger diameter to maintain the Reynolds number as low as practicable and well inside the laminar flow regime. To urge the pressure change or pressure drop through each of the tubes 60a, 60b to be about the same, factors controlling fluid drag are engineered to equalize the distribution of flow, by maintaining the same pressure drop from the feed annulus 56 to the plenum 61 through either set of tubes 60a, 60b. A diameter of from about an inch and a half (3.8 centimeters) to about two and a half inches (6.4 centimeters) serves a system 10 processing 100 gallons per minute (380 liters per minute, 0.38 cubic meters per minute). Such a diameter range provides the maximum available flow area while still providing structural integrity of the central tube 54 and shaft 18 after penetration by the tubes 60.

Figure 8:
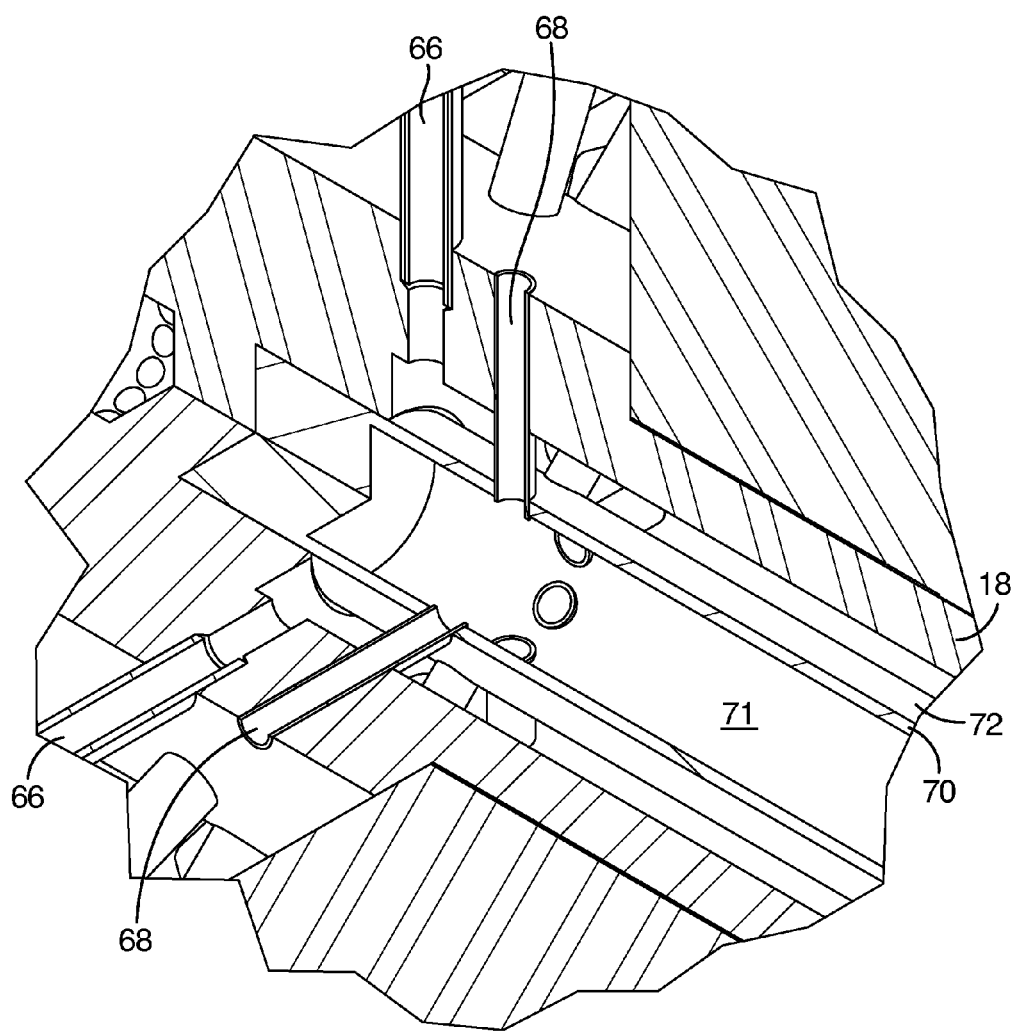
FIG. 8 is a partially cut-away, perspective view of the exit (effluent) end of the CCS, illustrating the penetrations and connections about the central shaft and effluent passages.

Referring to FIG. 8, the penetrations of each of the tubes 62, 66 into the shaft 18 and central tube 70 at the effluent end are illustrated. The pick-up tube 66 or the heavy species effluent tube 66 may threadedly engage the wall of the shaft to feed the heavier species of the effluent into the annulus 72. The port 68 carrying off the comparatively lighter species separated out, connects into the central tube 70, thus feeding the lighter species of effluent into the lumen 71.

Referring to FIGS. 10-14, while continuing to refer generally to FIGS. 1-19. The fin pack 86 with the channel 87 defined between adjacent fins 88 connected by a back plate 89 supports primarily two types of plates 90, 94. The first is the rectifier plates 90a, 90b. The second type of plate 94 is a coalescence plate, urging coalescence.

A coalescence plate 94 may be defined by a center line 95 or radial center line 95 circumscribing a circle extending at a particular radius selected as the design radius at which the diffusion band will exist. In general, the radial center line 95 (circle 95) of a coalescence plate 94 may be designed to be a stagnation location for the dispersion band 120 passing axially through a channel 87. In certain embodiments, the coalescence plate 94 may be coated with an oleophilic and hydrophobic material, or with an oleophobic and hydrophilic material, depending on the operational function (e.g., separating dispersed oil or dispersed water respectively) of the CCS 12.

Apertures 96 in the coalescence plate 94 may be both inner apertures 96a and outer apertures 96b. Accordingly, the lighter species (e.g., oil) divided at the stagnation line 95 at the stagnation radius 99, will smear and coalesce, migrating radially inward toward the inner apertures 96a. Meanwhile, the heavier species (e.g., water) will coalesce together and move away from a hydrophobic plate 94, migrating radially outward. Some of the heavier species will pass through the outer apertures 96b. Other portions may continue to pass on or around the periphery of the coalescence region 101 of the plate 94.

Rectifier plates 90 are sequenced just downstream of the plenum portion 61 of the main cavity 17 of the rotor shell 16. A principal value is in the ultimate establishment of the LAVD profile in the bulk flow 35 passing through each channel 87 of the main cavity 17 of the rotor shell 16. Accordingly, these rectifier plates 90a, 90b are in close proximity (e.g., an inch or two, 2.5 to 5 cm) to one another, and have apertures 92 sized to strip eddies from the flow. Accordingly, the size of the individual apertures 92 in the plates 90 is a matter of engineering calculation.

The rectifier plates 90 are responsible to become velocity profile generators. An operational objective of fluid management within the CCS 12 is to help establish and maintain a laminar, annular, velocity distribution. This profile represents the effective velocity at any point across any annulus. For example, the cavity 17 of the shell 16 operates as an annulus. The central shaft 18 consumes the center space and the shell 16 itself defines the outer limits of the cavity 17. Between those two is an annular flow. Nevertheless, this flow is subdivided by the fins 88. However, circumferential flow is virtually non existent. Only to the extent that certain disturbances, eddies, turbulence cells, or the like may exist is there any circumferential or radial flow. The bulk flow 35 through the system 10 is axial and laminar.

In the illustrated embodiment, the rectifier plates 90 are set axially in series, in a pair. Typically, the two in sequence are similar or identical in the distribution of apertures 92 therein. They are offset circumferentially from one another by at least one half a hole 92 diameter. That is, the apertures 92 are not aligned, but are each offset by a value of one radius of the largest apertures 92. Thus, a laminar, annular, velocity profile is supported.

A function of the rectifier plates 90 is to remove eddies, circumferential and radial flows of mass and momentum. Thus, the apertures are sized such that the largest diameter of an aperture 92 in a rectifier plate 90 is selected to be not more than half the inside diameter of any influent pipe 60. The smallest diameter pipe 60 controls.

Eddies having an order of magnitude of the diameter of an influent pipe 60 cannot persist when having to pass through an orifice 92 half of that diameter.

The fraction of open area devoted to apertures 92 in each of the plates 90 is a design parameter. The principal controlling parameter is the dimensionless Reynolds number of the flow. A Reynolds number is equal to a density of the fluid passing through any structure, multiplied by the velocity and a significant length, all divided by the viscosity. Units must be consistent, of course. A suitable value of Reynolds number is at or below about one thousand. The system 10 may operate with Reynolds numbers below about two thousand. However, it has been found most effective to avoid turbulent flow, to maintain a Reynolds number of from about five hundred to about fifteen hundred. A good target or set point is a value of about one thousand. In this range, and at these set point values, the flow can move through the apertures 92 in the plates 90, without transferring momentum across laminar streamlines. Such transfer delays separation by sustaining dispersion.

The Reynolds number is based on a significant length. That significant length for each aperture 92 is its diameter. However, the effective diameter for the entire flow is four times the area divided by the wetted perimeter. Wetted perimeter includes the total value of the perimeters of every aperture in each fin pack 86. Similarly, the area is the total flow area or open area available to the fluid flow 35 Thus, the net flow area available and the hydraulic diameter may be engineered together to provide the appropriate Reynolds number for the mass or volumetric flow rate of material passing through the plates 90.

It is valuable to maintain the apertures 92 as close to one another as possible. Structural strength and stiffness considerations may be used to engineer the web of material permitted to exist between the apertures 92.

Likewise, since each aperture 92 acts as an individual orifice 92, the area of each aperture 92 must be de-rated according to its specific geometry. For example, smoothing edges or rounding corners improves the effective area of each orifice 92. Typically, the apertures 92 are derated to about seventy percent of their diameter. This number may be varied with shaping, but shaping also takes its toll of the net available material required in the web of metal into which the apertures 92 are drilled or otherwise formed.

Another parameter considered is the distribution of apertures. In order to assist in establishing as rapidly as possible the LAVD profile, more openings near the radius of maximum velocity and larger diameter, permit more flow. In contrast, near boundaries of solids, e.g., the inside surface 74 of the shell 16, and near the shaft 18, the diameters may be reduced. The hydrodynamic analysis for creating a rectifier plate 90 full of apertures 92 may use the foregoing to establish the flow rate, and Reynolds numbers to be designed into accs12 and system 10.

The ultimate decision on aperture size distribution is best based on optimizing the LAVD profile. This has been a principal fallacy in many prior art attempts to construct a CCS 12. The fallacy that equations for fully developed flow are applicable to a centrifuge have been shown invalid in the experimental and analytical work of Applicants hereof.

In contrast, the flows in prior art systems have not been fully developed. Dispersion persists. Laminar flow equations have been inappropriately applied, do not predict performance, and the result is a scaling problem. To scale a particular design up or down, in volumetric flow rate, or size has failed to have precision or predictability in prior art systems.

The simultaneous solution of the Reynolds number equation while matching or satisfying the continuity equation may assist. The area available for flow 35 through the shell, multiplied by the velocity of the bulk flow 35 through the shell 16, amounts to the volumetric flow rate. Thus, the area of each individual aperture 92 multiplied by the velocity through each aperture 92 provides the effective Reynolds number through that aperture 92. A simultaneous solution of the continuity and Reynolds equations for the open area of the entire plate 90 helps define the required Reynolds number limitations to enforce the LAVD profile.

Thus, each aperture 92 of the plates 90 causes a comparatively small increase in turbulent intensity (used here in its ordinary meaning as a physical property of any fluid flow, known in the art of fluid mechanics) but reduces its region and effect, thus helping enforce the LAVD profile. Constituents within the flow 35 passing through each plate 90a, 90b need most an equal probability of moving toward the central shaft 18 as lighter constituents, or outer shell 16 as heavier constituents, dominated by buoyancy not momentum, in the shaft 18, within the cavity 17 of the shell 16.

Typically, it has been found that from about 0.6, to about 0.75 is the effective fraction of area in each aperture 92. Typically, the range of operation is between about 0.65 and 0.68. This may be established experimentally according to the thickness of each plate 90, and aperture 92 sizes, in view of the stripping of eddies out of the flow by the narrowed diameter of each aperture 92, compared influent tubes 60.

Stated another way, one function of the maintenance of a modest Reynolds number (well below turbulent transition of 2,100, typically below 1,500 and targeted at about 1,000) is to alleviate any predisposition of fluid to cross a laminar streamline in a radial or circumferential direction, by virtue of momentum transfer. Instead, the system 10 and particularly the rectifier plates 90 in accordance with the invention are designed to operate with streamlines intact, and unviolated by lateral transport of momentum or mass at any appreciable convective rate. Of course, streamlines exchange momentum by shear with one another at a much lower rate. However, streamlines in laminar flow do not transport momentum by bulk convective fluid transfer. Rather, it is transmitted by shear between streamlines. Accordingly, in a system 10 in accordance with the invention, shear transfer between streamlines is the most significant momentum transfer. Thus, the importance of stripping eddies out of a flow, and maintaining it laminar is extremely valuable in improving performance.

Moreover, buoyant forces dominate due to the many g's of acceleration in direct proportion to the radius times the square of angular velocity. All other forces are preferably relegated to be much less, even approaching an order of magnitude less.

The effect of the foregoing is to provide a maximum settling in available settling length and residence time for constituent liquids, and entrained solids. In conventional settling tanks operating under the influence of only gravity, buoyant forces are not capable of being driven to the comparatively larger values provided in a CCS 12. Here, by maintaining laminar, uni-directional flows, neutralizing any radial or other orthogonal (to axial) vectors in momentum or mass transport, the CCS 12 may establish a dispersion band 120 comparatively quickly. Along the axial direction 11a of the CCS 12, the band 120 thins down to approximately a mere boundary between two distinct species.

Figure 9:
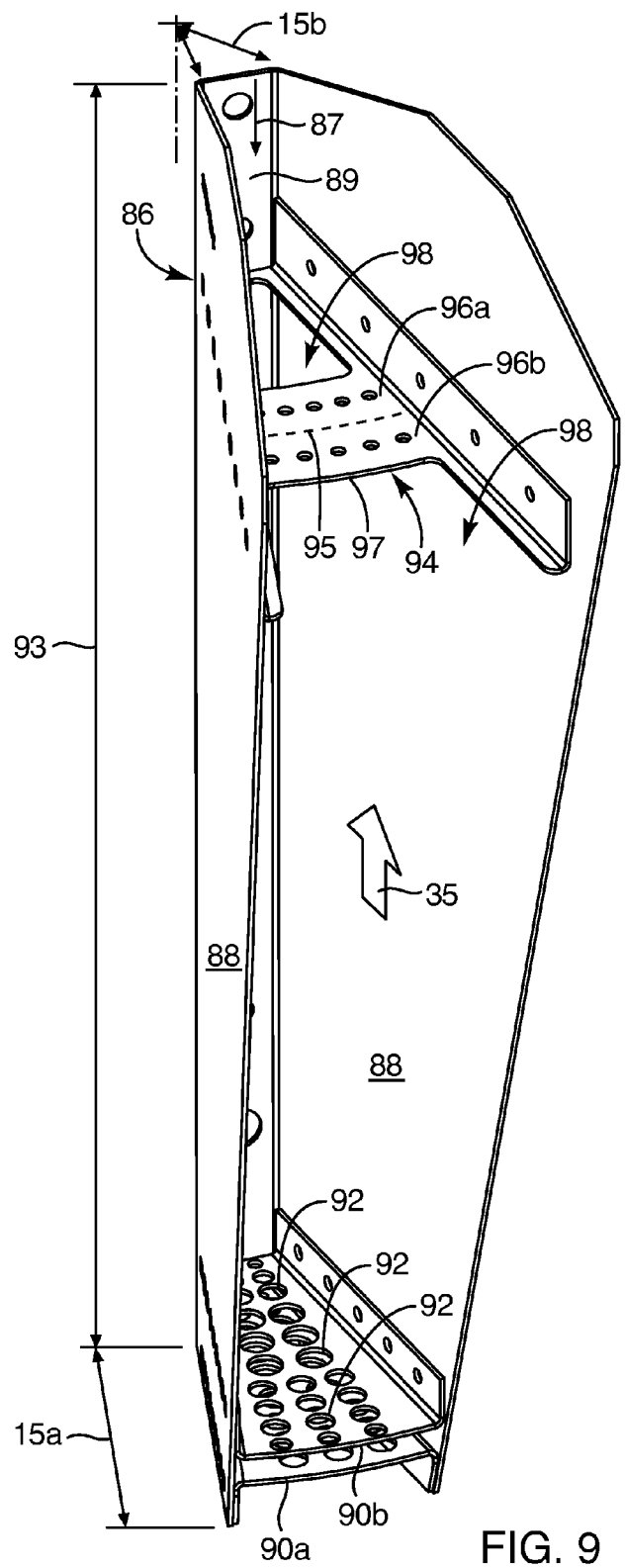
FIG. 9 is a perspective view of one embodiment of a fin pack, containing support structure and included diffuser (diffusion) plates and coalescence (coalescing) plates, as segments to be combined within the rotor shell.

In the illustration of FIG. 9, a length 93 of a fin pack 86 may be selected according to the desired throughput. The length 93 is approximately the settling length 93, but not the exclusively controlling parameter. For example, the plenum 61 exists within each channel 87 of each fin pack 86. In the illustrated embodiment, the fin pack 86 must stop short of the influent end of the shell 16, to accommodate the influent tubes 60. The influent tubes 60 contain and cause some eddies at sizes up to their diameters, although they assist or encourage the developing of the LAVD profile. Thus, the length 93 of a fin pack 86 may be thought of as the effective length available for settling.

The characteristic parameter is the settling area, defined by the length 93 in which settling activity is available, multiplied by the circumference at which settling occurs. In the illustrated embodiment, the center line 95 (circle 95 at radius 99) in the coalescence plate 94 may be thought of as the set point 95 or the desired position 95 of the center of a dispersion band 120. The center line 95 is not a line at all, but is a circumference traversing the entire coalescence plate 94. The boundary 122 of the two species of fluids may occur at minimum thickness of the dispersion band 120. Of course, a system 10 may operate off the design point, but the operational design circumference will be defined by the center line 95.

The radius 15a for the fin 88 of a fin pack 86 reflects the narrower end of the shell 16. The radius 15c reflects the larger diameter of the rotor shell 16 at the effluent end thereof. A radius 15b is a shaft radius 15b from the center line 13 or central axis 13 about which the CCS 12 rotates.

In one presently contemplated embodiment, a length 93 about 48 inches (1.2 meters) and a radius 15c about 17 inches (43 centimeters) offset from the central axis 13 by a radius 15b of about 1.75 inches (4.4 centimeters) provide a flow rate of production water separation from entrained oil and other dispersed contaminants of about 100 gallons per minute (0.4 $m^3$ liters per minute) at a rotational velocity of about 1,500 revolutions per minute. Meanwhile, the radius 15a along the bottom of the fin 88 is about 9.25 inches (23 centimeters).

Figure 10:
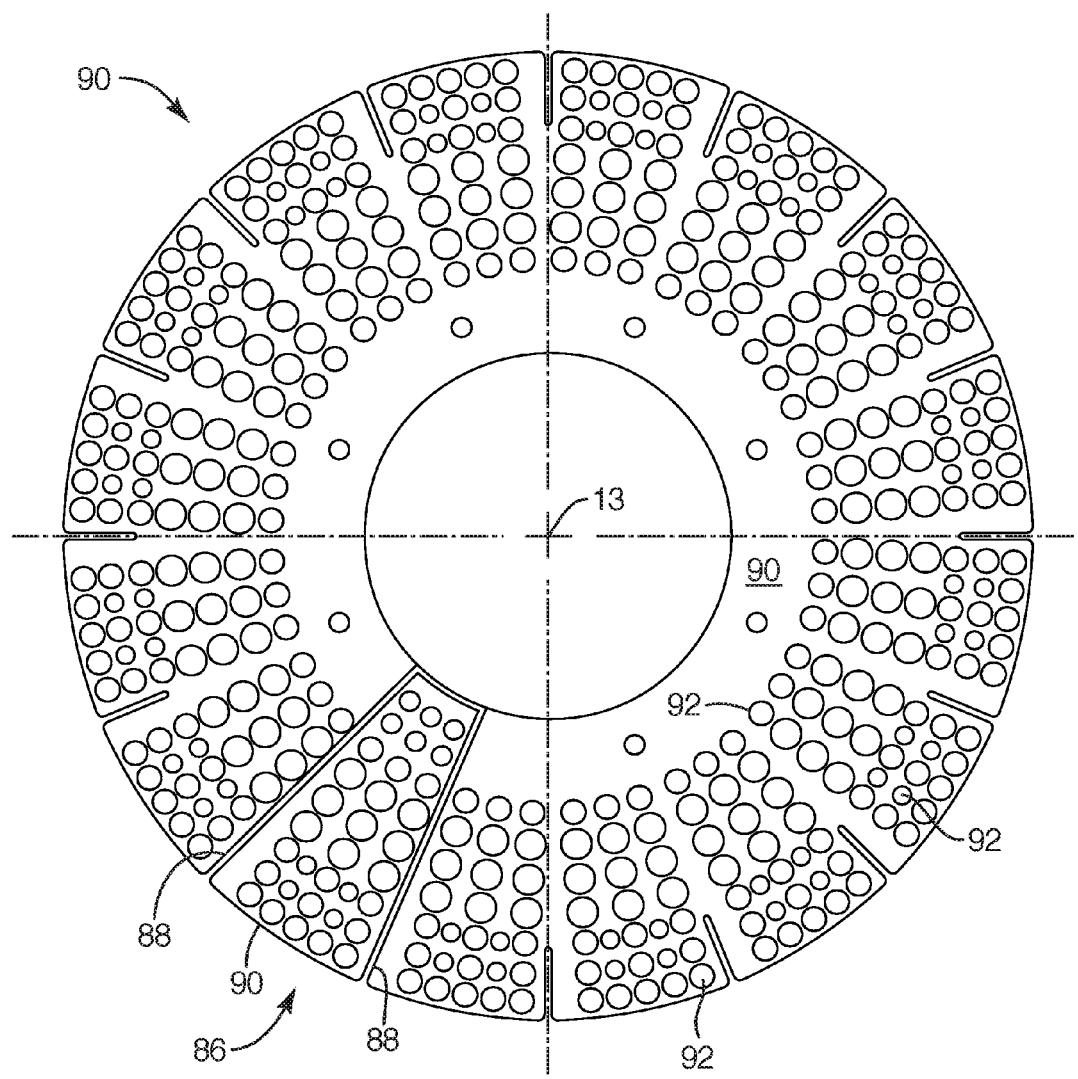
FIG. 10 is an influent-end, cross-sectional, elevation view of the configuration of the diffuser plate formed by the fin pack assembly that fits within the rotor shell of a system in accordance with the invention.

Referring to FIG. 10, in the illustrated embodiment, the rectifier plate 90 has three distinct sizes of apertures. The smallest apertures 92 have a diameter of about ⅛ inch (3 millimeters), the largest a diameter of about ⅜ inch (1 centimeter), and the intermediate apertures 92 a diameter of about ¼ inch (6 millimeters).

Figure 11:
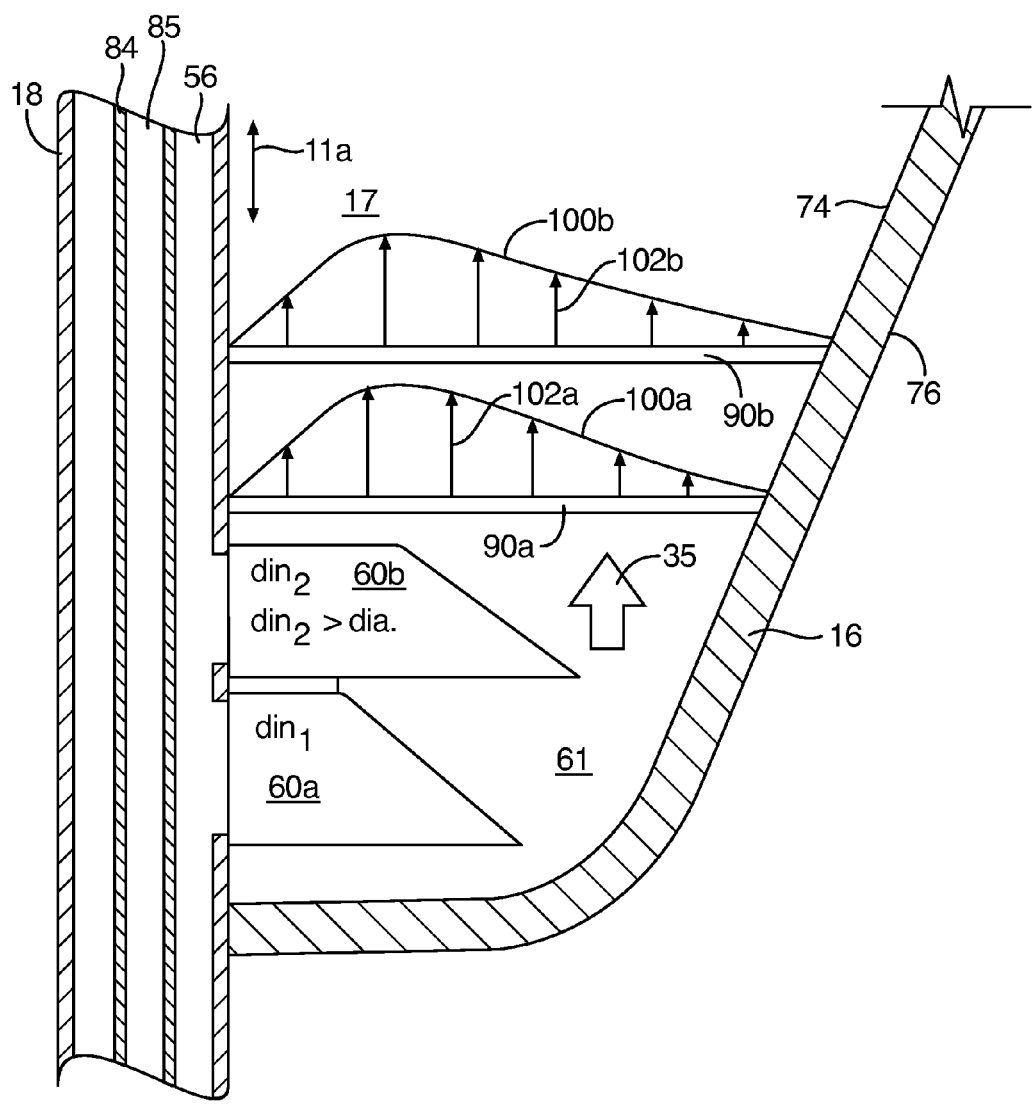
FIG. 11 is side elevation, cross-sectional view of a portion cut away from the rotor shell, near the influent end thereof, having superimposed thereon velocity profiles of the laminar, annular, velocity distribution.
Figure 11:
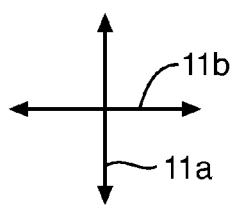

Referring to FIG. 11, an example of the LAVD profile establishment above the plenum 61 in the cavity 17 of the shell 16 is illustrated. Laminar flow is effectively maintained in preferred embodiments throughout the influent annulus 56 feeding the influent tubes 60a, 60b. The adjacent rectifier plates 90a and 90b receive flow of influent from the influent tubes 60a, 60b as discussed hereinabove. The plenum 61, in combination with the overall geometry, including lengths, angled openings, and so forth maintains laminar flow.

Upon impingement of the bulk flow 35 against the first rectifier plate 90a, the eddies larger than apertures 92 are stripped from the flow 35. Bulk (convective) momentum transfer in a radial or circumferential direction is attenuated at boundaries of the apertures 92 in the plate 90a and are not permitted to pass through. Rather, laminar flow and reduced turbulent intensity are effectively enforced by the first plate 90a. Thereafter, the second plate 90b establishes a profile 100.

The plate 90a enforces the velocities 102a resulting in the velocity profile 100a. The plate 90b establishes a distribution of velocities 102b to create the profile 100b. Each of the plates 90a, 90b attenuates eddies that would otherwise aid momentum transfer in a radial or circumferential direction. Thus, the profiles 100a, 100b become the establishment of an annular flow. One will note that the velocities 102a, 102b are higher away from both the shaft 18 and the inner surface 74. This is understandable as the effect of a lesser linear contact, and thus a lesser swept area near the shaft 18, and a greater swept area, with its associated degradation of momentum of the flow 35 at the surface 74.

Figure 12:
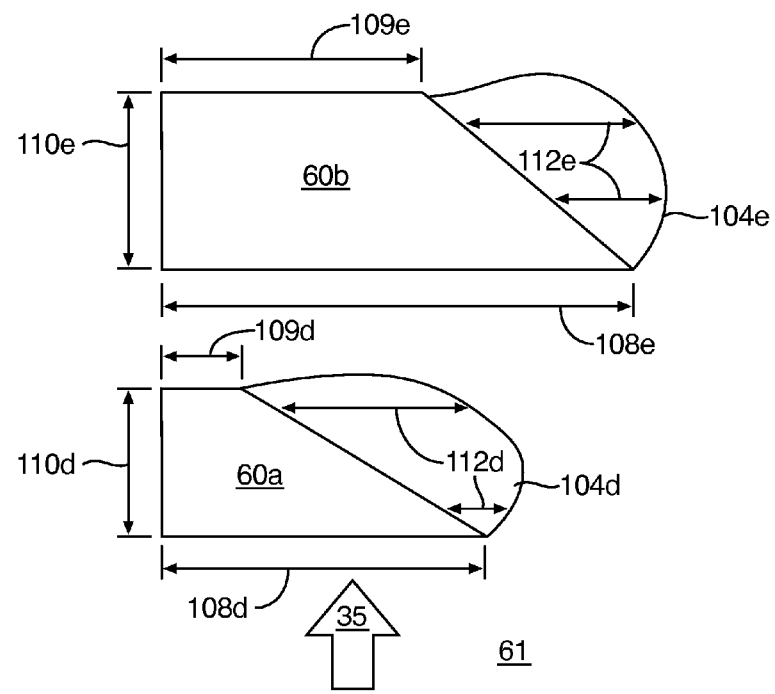
FIG. 12 is a schematic diagram of turbulent intensity in relation to various development lengths, including a schematic diagram of the turbulent intensity profile resulting from the influent tubes used for introducing influent materials into the influent end of the rotor shell in a staged axial distribution and a staged radial distribution of the flows.
Figure 12:
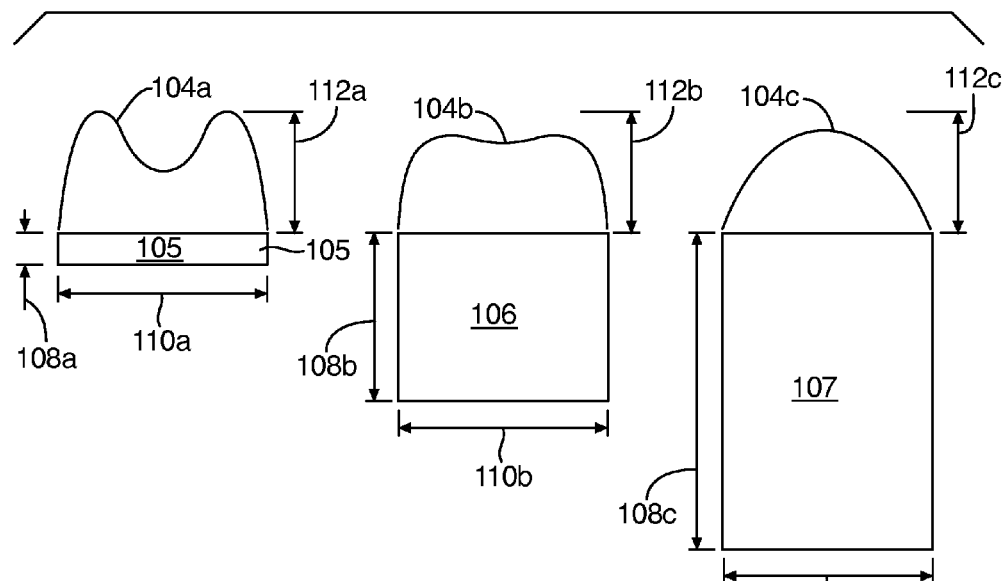

Referring to FIG. 12, the turbulent intensity 112 of a flow is illustrated in various configurations. For example, a profile 104 represents turbulent intensity 112 across the overall effective diameter 110 of an aperture defining a passage 105. For example, the passage 105 has a comparatively short development length 108a, due to the fact that the passage 105 is through a plate, like an orifice.

The reference numeral 105 refers to the aperture or passage in a plate, where the flow is in a vertical direction, in the illustration. The effective diameter 110a may be thought of as the diameter of the aperture. However, near the extrema or edges of the passage 105, the value of the turbulent intensity 112a is substantially greater near the center of the diameter 110a.

More turbulence near the edges results in a substantial fraction of energy devoted to movement of the fluid in directions other than forward through the passage 105. Since the development length 108a is so short, the flow has not developed, and the peaks or horns at the outer extrema of the diameter 110a contain randomly directed energy and momentum contributing to persistence of dispersion, not contributing to forward motion.

In contrast, the passage 106 represents a tube with a development length 108b longer than the development length 108a. For the same diameter 110b the profile 104b reflects a much more consistent value of turbulent intensity 112 across the entire diameter 110b. The central portion of the profile 104b has approximately the same value as that near the outer extremes of the diameter 110b.

The passage 107 represents a comparable diameter 110c, but a substantially greater developmental length 108c. The result is a decrease in turbulent intensity near the extremities of the diameter 110c, and a much larger turbulent intensity near the center of the profile 104c. This is due to the fact that a boundary layer in a fluid proximate a fixed, solid boundary tends to lose radial momentum.

Thus, in general, a lumen 105 representing an aperture in a plate provides a comparatively small development length 108a. A longer lumen 106 represented by a comparatively longer distance, in a comparatively short tube, will have a longer development length 108b with a more uniform turbulent intensity profile 104b. Finally, the longer tube lumen 107 provides a comparatively longer development length 108c resulting in a more classical distribution of turbulent intensity 112c, according to the profile 104c.

In the illustrated embodiment, the slant cut opening is engineered to vector the influent flows from each of the tubes 60a, 60b axially with respect to the shell 16. Thus, the respective turbulent intensity profiles 104d, 104e represent something unlike any of the turbulent intensity profiles 104a, 104b, 104c. On the one hand, the blunted and more uniformed profile 104b is most like the profiles 104d, 104e. However, the turbulent intensities 112d, 112e are not symmetric, due to the fact that the long side length 108d, 108e of each the tubes 60a, 60b, respectively, is substantially greater than the effective length 109d, 109e of the shorter sides.

The profiles 104d, 104e tend to blunt turbulent intensity, thus fostering low turbulent intensity 112 generally, and rendering the bulk flow 35 in the plenum region 61 suitable for rapid development of the LAVD profile 100 of FIG. 11.

In the illustrated embodiment, the diameter 110d is less than the diameter 110e to balance out drag effects of the increase in lengths 108e, 109e, compared to the lengths 108d, 109d.

The engineered fluid drag should be approximately the same through each of the tubes 60a, 60b, thus reducing turbulent intensity 112 outside, or at a periphery of either of the tubes 60a, 60b. For example, controlling the turbulent intensity 112, in order to reduce it, within each of the tubes 60a, 60b may be largely for naught if the overall velocity exiting each of the tubes 60 is substantially different from the velocity of the surrounding fluid in the plenum 61.

The energy profile or turbulent intensity profile 104 exiting each of the tubes 60 presents a staged introduction and distribution in an axial direction, radial direction, and circumferential direction, encouraging rapid development of an LAVD profile 100 in the flows exiting the rectifier plates 90. Typically, it has been found for the dimensions discussed hereinabove, the rectifier plate 90 receives a substantially uniformly distributed laminar flow, approximately a normal curve, not fully developed. As discussed hereinabove, the rectifier plates 90a, 90b with their distribution of selectively sized apertures 92 quickly enhance or accelerate the development of the LAVD profile. The turbulent eddies emanating in and around the exits of each of the tubes 60 reduce in turbulent intensity to accelerate development into an LAVD profile 100b.

Figure 13:
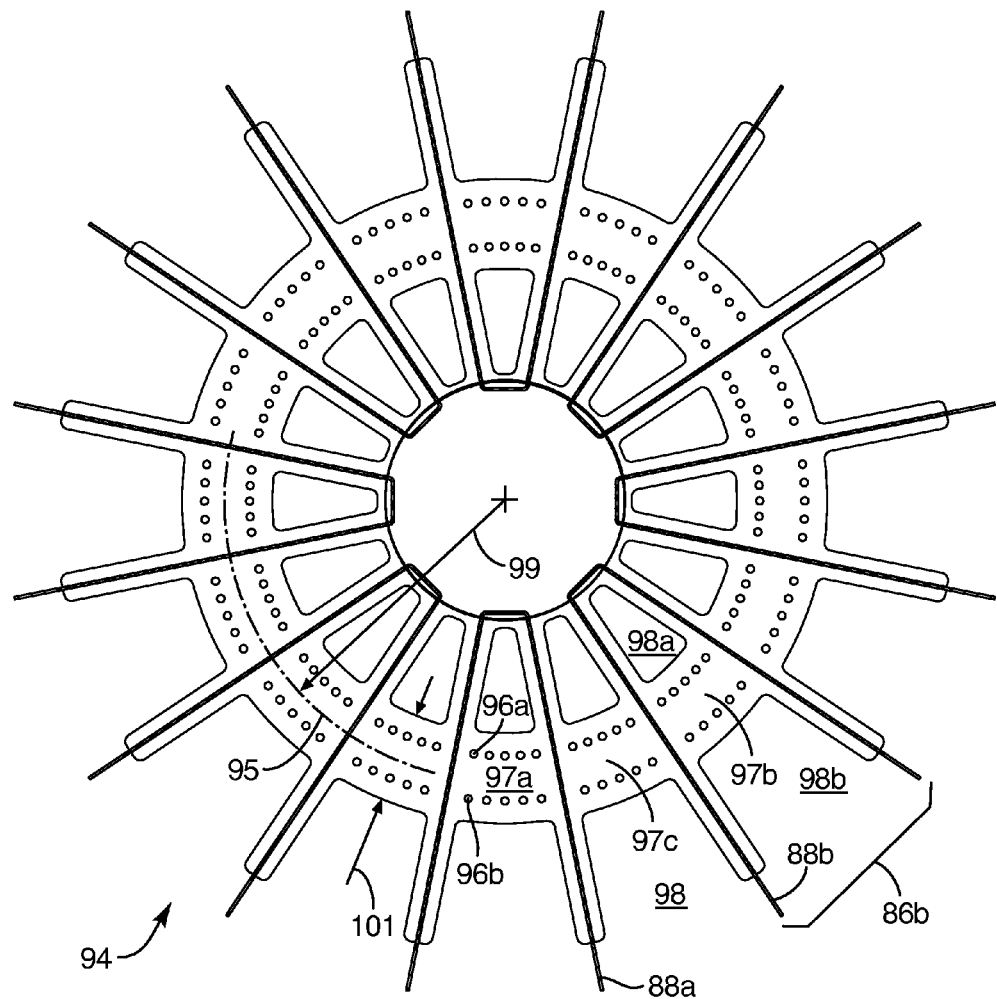
FIG. 13 is an effluent-end, elevation, cross-sectional view of the fin packs of FIG. 11, assembled as constituted within the rotor shell of the system, illustrating one embodiment geometry of the coalescence plate.

Referring to FIG. 13, a coalescence plate 94 or coalescing plate 94 encourages coalescence of each species being separated. In the illustrated embodiment, each coalescence plate 94 is actually a combination of segments 97 secured to adjacent fins 88. A region of openings 98 or gaps 98, through which the bulk flow 35 may pass, flank or bound the actual coalescence region 101 or portion 101. Once assembled, each fin pack 86 contributes its segment 97 of the coalescence plate 94 to the overall coalescence plate 94.

The coalescence plate 94 may be secured by various structural ribs or elements that provide structural stiffness to the coalescence plate 94, adjacent fins 88, or both. One significance of the coalescence plate 94 is stagnation of the diffusion band 120 as close as practical to the central diameter 95 or center line 95. A diffusion band 120 preferably decreases in thickness toward an infinitely thin boundary between two separate species 114, 116.

The reality is that some amount of dispersed liquid constituents may exist, or solids in suspension, in the dispersion band 120 at the boundary 122 between the two separated species. However, in general, the individual fin packs 86 are assembled by securing the individual fins 88 adjacent one another, to create the coalescence region 101 centered on the dispersion band 120 proximate the center line 95 or circumference 95.

Radially, outside and inside the circumference 95, apertures 96 perforate the plate 94. For dispersed oil being separated from a water carrier, the heavier species is water and migrates along the coalescence plate 94 toward the apertures 96b, and the outer gap 98b. Meanwhile, oil constituents migrate radially inward along the coalescence plate 94, toward the apertures 96a, and the inner gap 98a.

The apertures 96 provide a mechanism by which a quantity of the separated constituents may pass through the coalescence plate 94. This aids separation while alleviating the pressure drop or decrease otherwise created downstream of the diffusion plate 94.

In the illustrated embodiment, each fin pack 86 is connected to the next adjacent fin pack 86 by way of an intermediate segment 97 that exists without being internal to a fin pack 86. For example, in FIG. 13, the fin packs 86a, 86b each include plate segments 97a, 97b respectively. In contrast, the segment 97c borrows a fin 88a from the fin pack 86a, and a fin 88b from the fin pack 86b.

Figure 14:
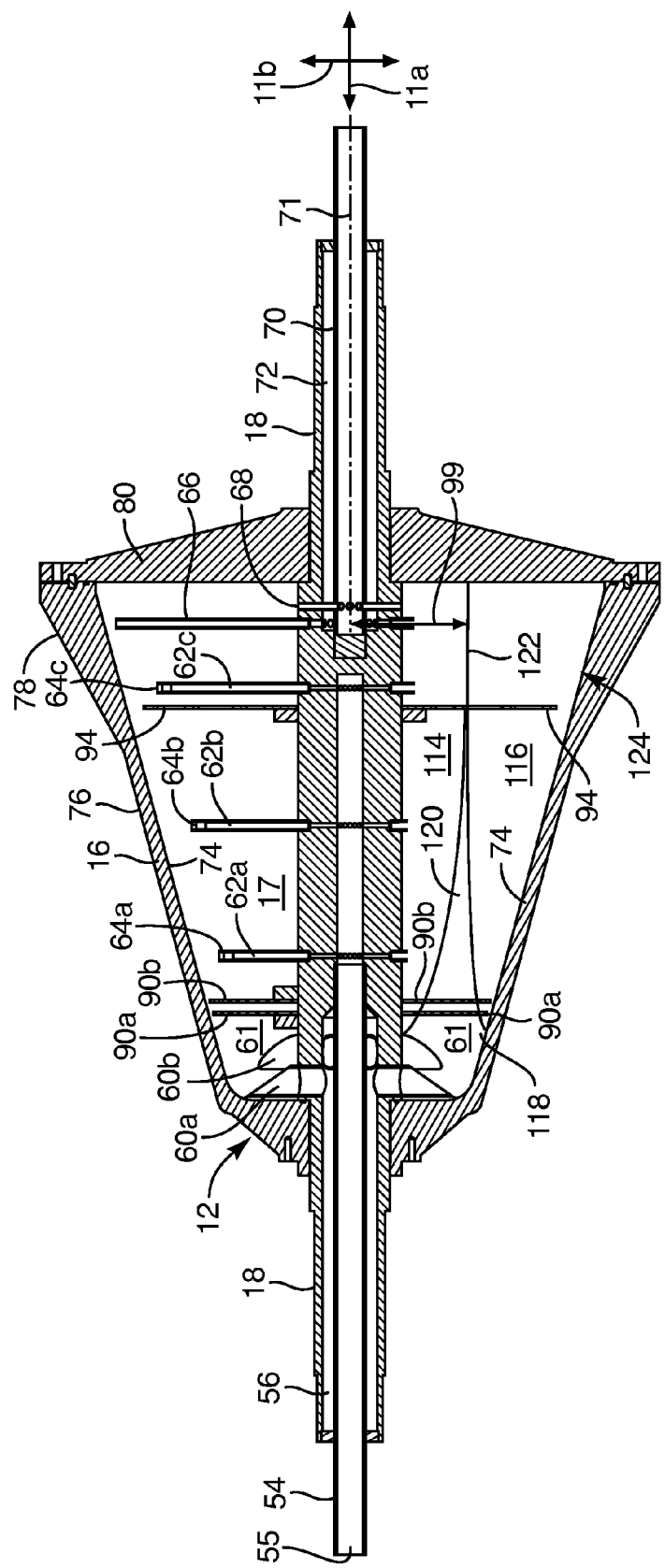
FIG. 14 is a side, elevation, cross-sectional view of the system of FIGS. 1-14, illustrating schematically one embodiment of a dispersion band development therein.

Referring to FIG. 14, a continuous centrifugal separator (CCS) 12 is illustrated with an influent annulus 56 feeding an influent into the cavity 17 of a CCS 12 defined by the rotor shell 16. The separated species exit through the respective light species annulus 72, and the heavier species passage 71 or lumen 71 in the central pipe 70 or tube 70. In the illustrated embodiment, the upper half of the apparatus 12 is illustrated with the rectifier plates 90, and coalescence plate 94 illustrated, as well as the cleaning tubes 62 or flush tubes 62, and the heavy species pick up tube 66.

The bottom half of the cavity 17 in the rotor shell 16 is illustrated to show the positions of the rectifier plates 90a, 90b, and coalescence plate 94, only. Thus, with reduced clutter, one can see an illustration of the dispersion band 120 separating out dispersed, lighter constituents 114 (e.g., oil) into a light region 114 and the heavier constituents 116 into a heavier region 116. The mixed influent 118 or mixed region 118 is in contrast to the separated species 114, 116. As illustrated, the dispersion band 120 begins to develop quickly, accelerated by passage of the bulk flow 35 through the rectifier plates 90a, 90b in series. Thereafter, the dispersion band 120 reduces in thickness, continuing toward the coalescence plate 94.

At the coalescence plate 94, separation is further accelerated, further narrowing the dispersion band 120, into a mere boundary 122. The boundary 122 may center on the radius 123 that forms a center line 95 of the dispersion band 120.

However, the illustration is a two-dimensional image of what is actually a three-dimensional device 12. Accordingly, the dispersion band 120 is actually a cylinder of sorts, or a distorted cylinder having a narrowing thickness and extending throughout the entire cavity 17, at or near the radius 99. Thus, treating the dispersion band 120 as a directrix, and sweeping that directrix at the radius 99 about the central axis 13 defines the "cylinder" that is the dispersion band 120.

The dispersion band 120, by virtue of its net circumference and axial length, represents the settling area of the CCS 12. Another way to think of the dispersion band 120 is as a trapezoidal frustum (that approximates a cylinder) centered about a radius 99. The radius 99 will be constant along the entire length of the cavity 17, due to the high acceleration in the radial direction 11b. The concept of a trapezoidal frustum at the radius 99 refers to the fact that a dispersion band 120 may be comparatively large, or extend across a substantial radial differential proximate the influent end, and thin to a virtual surface of negligible thickness proximate the effluent end.

To maximize settling area defined by the dispersion band 120 rotated about the central axis 13, the rate of removal of species may be used to position the dispersion band 120. To center the boundary 120 at the central circumference 95, one may adjust the position of the dispersion band 120 to coincide with it. This may be done by adjusting the outflow rates and back pressures on the passages 71, 72. Adjusting the relative back pressures against outflow of the heavier species 116 and lighter species 114, one may adjust the position of the dispersion band 120, optimize performance of the system 10, and center the dispersion band 120 on the coalescence plate 94.

Figure 15:
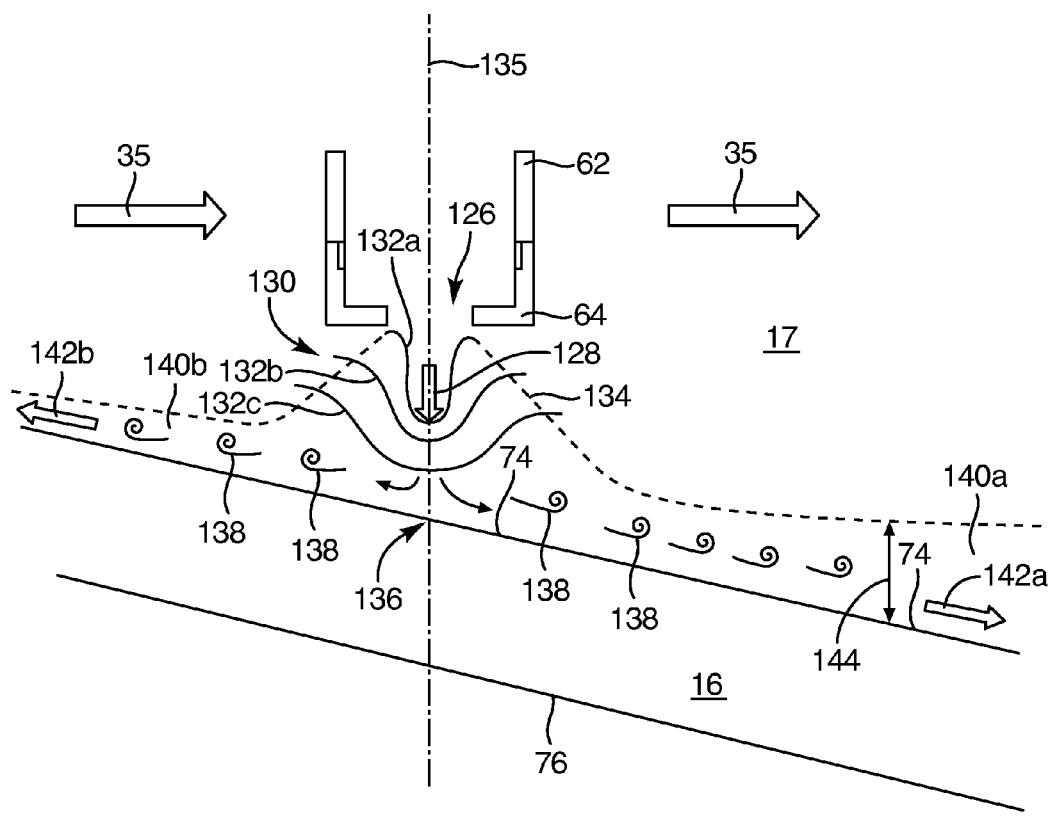
FIG. 15 is a schematic diagram of the outer wall of the rotor shell, and a portion of the cleaning tube proximate thereto, showing the nozzle with its entrainment jet velocity profile and developing boundary layer along the inner surface of the rotor shell wall during a cleaning operation.

Referring to FIG. 15, a flush tube 62, or an end portion thereof is illustrated, with a nozzle 64 attached. A nozzle 64 may not be required in all circumstances. However, the effect of a nozzle 64 is to develop a higher velocity according to the engineering principle of continuity at the exit 126 or aperture 126.

For example, if no constriction of the flow area exists in the orifice 126, and the orifice 126 is simply the opening at the end of the tube 62, fluid drag considerations will preclude a change in velocity, and a drag penalty must be accommodated along the entire path length, through every fixture and conduit through which the fluid travels. On the other hand, in the illustrated design, the cross-sectional area, for all components, may be comparatively larger, resulting in lower velocities, and much less drag, thus delivering a flow at the orifice 126, which has a higher available energy and pressure, and a higher velocity upon exit.

In the illustrated embodiment, through the orifice 126 passes a liquid (e.g. cleaning water or solution) at a velocity 128 of flow formed in a jet 130 having a velocity profile 132. As illustrated, with distance away from the orifice 126, the jet 130 takes on subsequent velocity profiles 132a, 132b, 132c. The jet 130 entrains across the boundary 123 the surrounding fluid, expanding the size of the jet 130, with respect to a central axis 135.

Contrary to the design of many prior art nozzles, the nozzle 64 is discharging fluid into a surrounding fluid. An entrainment jet 130 is the effective hydrodynamic result of the nozzle 64 operating. Rather than a spray over a larger area, the jet 130 is contained within the boundary 134, and exchanges momentum across the boundary 134. As the center of the jet 130 proceeds along the center line 135, it broadens the boundary 134, reducing the center velocity of the jet 130, and increasing the velocity of the entrained adjacent fluid. The jet becomes larger, involves more mass, at a lower maximum (center) velocity.

The jet 130 impinges against the surface 74 of the shell 16 at a stagnation point 136 on the surface 74. Fluid that strikes the fixed, rigid, solid surface 74 does not proceed through it, but redirects. Some of the flow will form eddies 138, going in both directions, upstream and downstream, developing a boundary layer 140. The downstream boundary layer 140a tends to grow, adding entrained mass from the bulk flow 35, and traveling downstream toward the vertex 82 as discussed hereinabove.

In contrast, the boundary layer 140b upstream tends to thin out and decrease, being not aided but greatly inhibited by the net centrifugal influence of the rotating shell 16. Flow 142a is driven by the acceleration of rotation toward the vertex 82, while the flow 142b is inhibited.

Stagnation of the jet 130 results in a substantial transfer of momentum. The entire velocity 128 perpendicular to the surface 74 must come to a zero value at the wall 74. Momentum must be transferred, some axially, into some eddies 138, scouring deposits adhering to the surface 74. Freed deposits enter flows 142a, 142b in the boundary layer 140. Entrained solids, as well as the liquid in the boundary layer 140 flows toward the vertex 82.

An additional benefit to a system and method in accordance with the invention is that the waste materials, such as debris, deposits, suspended solids, and the like accumulated on the surface 74 may be collected and flushed out dynamically. The boundary layer 140a proceeds toward the vertex 82, even while the CCS 12 continues to operate. Flush fluid passed through the feed tube 54 through the lumen 55 is eventually injected through the various flush tubes 62, resulting in the jets 130 simultaneously with continued operation. The trapezoidal shape of the shell 16 tends to migrate precipitants, debris, deposits, and the like scoured from the surface 74, toward the vertex 82 for removal through the pick-up tubes 66. The heavier species 116 tends to entrain and sweep a fluidized slurry. The momentum transfer of fluid drag continues transport of liquids and solid particulates to extraction thereof through the pick up tube 66.

Another benefit, is rehydration of the particulate boundary layer. It is a property of sediments to settle and consolidate, losing the interstitial moisture that carried them to their initial position. The jet 130 provides rehydration of the boundary layer and fluid drag as a moving force to fluidize and migrate the entrained particulate solids to the maximum possible radius away from the central axis 13.

The comparatively small volume of such particulates, and localization proximate the surface 74 enables a rapid removal through the pick up tube 66. The relatively small portion of the volume of fluid introduced into the cavity 17 through the flush tubes 62 may simply be withdrawn in due course by the pick up tubes 66. No commensurate decrease in flow of influent through the annulus 56 is necessary. Positioning the dispersion band 120, if addressed at all during dynamic flushing, may be done simply by managing a pressure differential between the annulus 72, and the lumen 71.

Contrary to prior art assumptions, the jet 130 does not splash or spray, but spreads out according to fluid dynamics entrainment principles, and according to the acceleration forces exerted thereon. The distribution of the flush tubes 62 may be engineered as required, but three banks of sixteen serve well the illustrated embodiment.

If desired, solvents may dope the flushing fluid, and heating may increase the chemical reactivity of solvents, deposits, or both. Thus, dynamic flushing, solvent-doping, heating, any combination, and sub-combinations may be used. Static flushing is also available with draining of debris and liquids out through the apertures 84 or drains 84.

Figure 16:
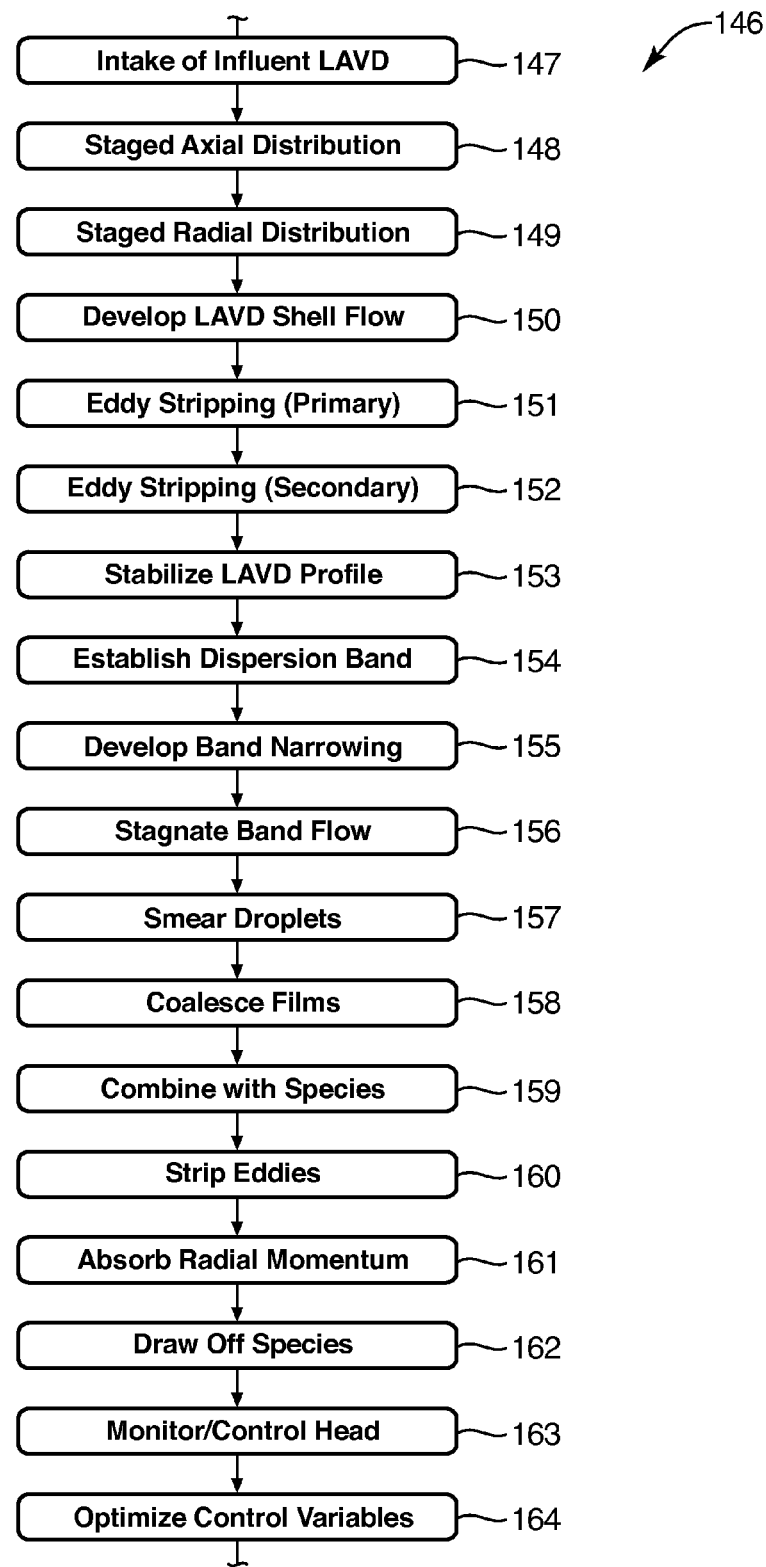
FIG. 16 is a schematic block diagram of a fluid treatment process through a system in accordance with the invention.

Referring to FIG. 16, a process 146 for treating a fluid, to separate out disparate species distinguishable by density, entrained solid particulates, or both, may involve intake 147 of an influent fluid, preferably as a laminar flow. In the illustrated embodiments of the apparatus discussed hereinabove, that flow has a laminar, annular, velocity distribution (LAVD) even at the incoming annulus 56.

A change in direction from axial 11*a* to radial 11*b* introduces the influent into the cavity 17 of a rotor shell 16. A staged axial distribution 148, staged radial distribution 149, or both 148, 149 may be included. Staged circumferential distribution will be typical. Thus, the introduction of the influent occurs at different locations defined by radius and axial position. The nature of the CCS 12 benefits from balanced circumferential distribution likewise.

The flow next develops 150 as an LAVD shell flow inside the cavity 17 of the rotor shell 16. Development 150 begins within the plenum portion 61, but is greatly accelerated by the rectifier plates 90*a*, 90*b* stripping 151, 152 eddies 138. Stripping 151, 152 of eddies 138 is removal of bulk momentum transfer in any direction other than axial 11*a* by passage through specifically sized orifices 92 or the like. Radial or circumferential flow is rapidly attenuated by passage through the apertures 92 or orifices 92.

Next, the bulk flow 35 stabilizes 153 in an LAVD profile between the central shaft 18, and the inside surface 74 of the rotor shell 16. The stabilizing 153 results in establishing 154 a dispersion band 120 progressing along the axial direction 111*a* of the cavity 17. Developing 155 the band 120, results in migration of dispersed droplets out of a narrowing band 120 along the axial direction 11*a*. The band 120 thus loses droplets of the lighter species 114 coalescing, drifting, and otherwise responding to their buoyancy difference from the heavier species 116.

Eventually, at a coalescence plate 94, the axial stagnation 156 of the band 120 results in a smearing 157 of droplets. Typically, at this point, the majority of each species is separated. However, smearing 157 results in changing the dimensions from the natural, spherical shape, driven by surface tension forces, to a flat, planar shape against the coalescence plate 94. More contact area, and a broader extent for each droplet, now a large planar, flat body, urges adhesion to or coalescence with the common bulk fluid. Each region 114, 116 connects to and draws with it its own species 114, 116. A flattened droplet of oil, for example, may be pressed against an oleophilic plate 94 from the dispersion band 120, thus placing it in a position to connect to the bulk of the lighter species 114, and be drawn thereinto.

Likewise, a heavier species, such as water, for example, may be smeared against the coalescence plate 94, thereby positioning it to contact its own heavier species 116, and be drawn into it. The coalescence 158 of films thus is a physical consequence of the smearing 157, and placing of the newly smeared, and thus flattened droplets of liquid into contact with their own species. Combining 159 occurs promptly by virtue of surface tension forces.

Stripping 160 eddies from the flows around the coalescence plate 94 is assisted by at least two mechanisms. Initially, passage of each individual species through its respective set of apertures 96 or perforations 96 provides direct access and passage. Perforations 96 support a reduction in the fluid drag pressure downstream. Moreover, by a 'phobic and 'philic coating, coalescence 158 may be accelerated.

For example, in one illustrated embodiment, having an oil species 114 as the lighter species 114, and water 116 as the heavier species 116, a hydrophobic, oleophilic coating will tend to assist in smearing 157, and consequent coalescing 158 of oil. Meanwhile, by rejecting the heavier species 116 or water 116, the coalescence plate 95 motivates a surface tension gathering of the smeared droplet back into the bulk of the heavier material.

Also, the comparatively small diameter, e.g. a quarter to about three quarters inch (6 mm to 19 mm) of each perforation 96 tends to prevent any radial or circumferential velocities generated by the stagnation 156 from propagating to the opposite or downstream face of the coalescence plate 94. Thus, eddies are stripped 160 from the flow, thus assisting in the absorbing 161 of radial momentum and circumferential momentum. Drawing 162 the separated species 114, 116 off occurs proximate the effluent and of the cavity 17 in the shell 16, through the pick up tube 66 for the heavier species 116, and the outlet port 68 for the lighter species 114.

In certain embodiments, monitoring 163, controlling 163, or both 163 may occur with respect to the pressure head difference between the column in the cavity 17 of the shell 16, and the column in the pick up tube 66. For example, the column of the heavier species 116 in the pick up tube 66 extends from the inlet at the outermost or distal end thereof, all the way radially inward to the shaft 18.

Meanwhile, the column above the port 68 is effectively the column of both species 114, 116 distributed across the cavity 17. One species 114 is radially inside, and the other species 116 is radially outside the boundary 122. That boundary 122 is the dispersion band 120 at its ultimate minimum thickness.

These two columns contain differing "depths" of the two separate species 114, 116 having two separate densities. The column in the pick up tube 66, is filled entirely with the heavier species 116. The column above the outlet port 68 is partially the heavier species 116 and partly the lighter species 114. Thus, a net difference in total column head will result.

This column head difference may be monitored 163 in order to control the location of the dispersion band 120, as defined by central radius 123. Finally, optimizing 164 control variables, may result in operation at a localized or universal maximum performance. This will be discussed hereinbelow in further detail.

Figure 17:
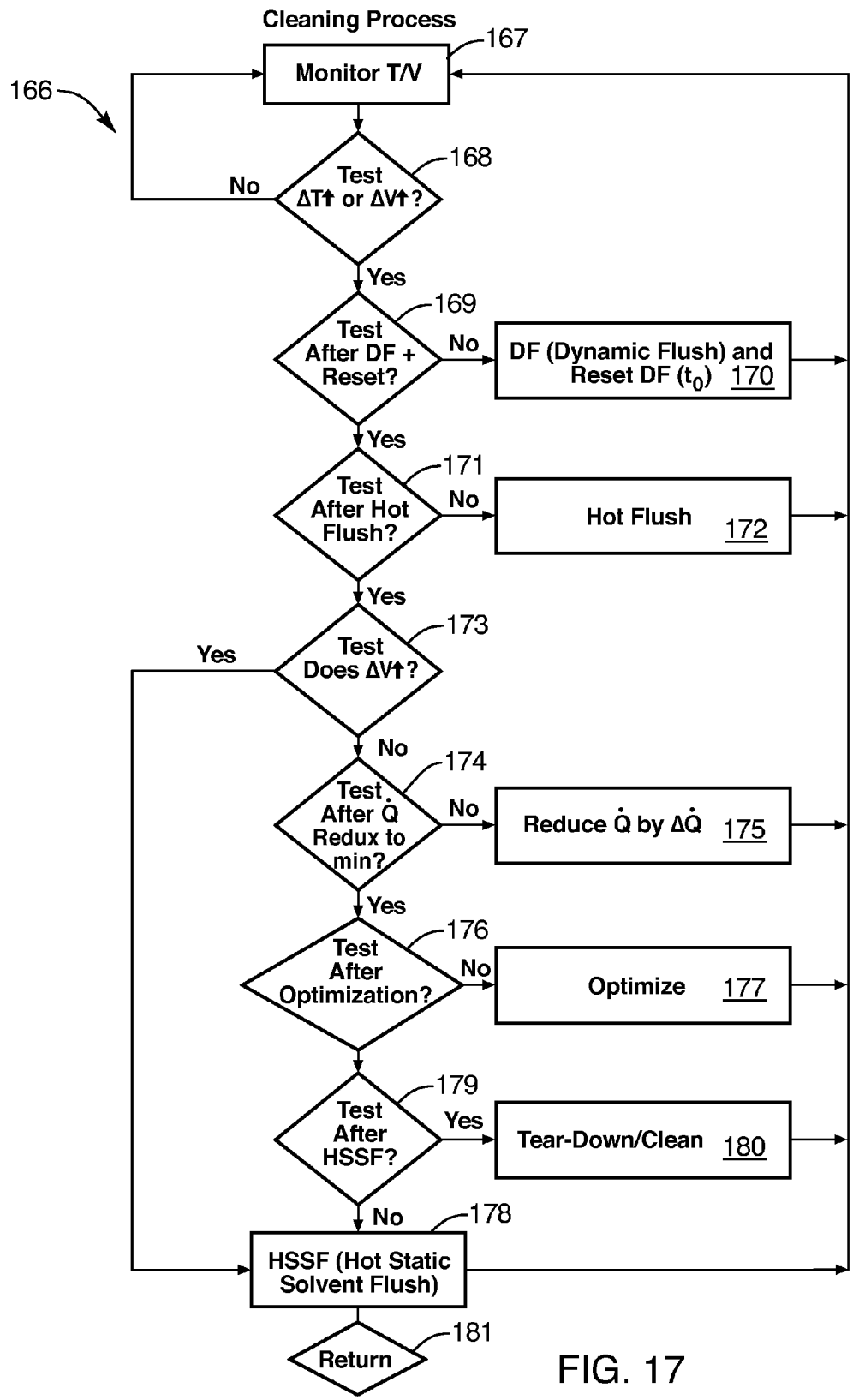
FIG. 17 is a schematic block diagram of a cleaning process, including control decisions influencing the sequence of dynamic, static, plain, solvent, and other flush processes.

Referring to FIG. 17, a cleaning process 166 may involve multiple tests, or decisions. For example, in one currently contemplated embodiment, monitoring 167 may include monitoring 167 turbidity in an effluent of one of the species 114, 116. The monitoring 167 may include monitoring 167 turbidity, indicating dispersion of a contaminant species in a flow of a carrier liquid. Thus, a failure or a limitation in the effectiveness of the separation may have occurred.

Likewise, an increase in vibration of the CCS 12 within its mounts 22 over time, may indicate deposits on the interior surface 74 of the rotor shell 16. Deposits will tend to separate, develop, or otherwise form asymmetrically to cause slight variations in balances of mass. Accordingly, vibration may increase with unequal distribution of deposits. Also, the system 10 may operate at less than optimum design conditions, resulting in reduced efficacy of the separation processes. Thus, an increase in suspended solids may result in turbidity within an effluent.

Accordingly, by monitoring 167 turbidity of the effluent, in one or both species, and monitoring 167 vibration, one may have the information needed to test 168 for an increase in turbidity or an increase in vibration. A threshold value of vibration may be used, but a better test 168 evaluates to determine for a recent change or rate of change in turbidity. It may test 168 for a recent change over some threshold period of sampling time in vibration. If an increase is detected, then an affirmative answer leads to a follow up test 169. If no increase is detected, then the test 168 returns control back to the monitoring 167 to continue.

The test 169 determines whether the data delivered to the test 168 was taken after a dynamic flush and reset of the flush frequency. If the test 169, which has the data available from the monitoring 167, detects that a dynamic flush and reset has already occurred, then the test 169 proceeds. If however, a dynamic flush and reset have not occurred, the negative response triggers execution of a dynamic flush and reset 170 to time zero to continue periodic flushes. By dynamic flush is meant the dynamic flush process described hereinabove. By reset is meant the reset of scheduling the dynamic flush 170 with the frequency of future, time-based flushes to reset to that beginning point.

On the other hand, an affirmative response to the test 169, indicates a dynamic flush was previously done in response to the same detection of the test 168. This results in a test 171 determining whether a hot flush 172 has been done based on the test 168 evidencing increases in turbidity, velocity, or both. If the test 171 returns a negative response, no hot flush 172 has occurred based on this test 168 of increases in turbidity, velocity, or both. If the test 171 returns a negative response, indicating that no hot flush 172 has occurred based on this same data, a hot flush 172 is conducted, dynamically, as described hereinabove.

If the result of the test 171 is affirmative, a hot flush 172 was recently done based on the same data of the test 168. A test 173 determines whether the increase detected includes an increase in vibration. If negative, vibration has not increased. A test 174 determines whether a reduction 175 has occurred in flow rate.

Based on the same test data of the test 174, a negative answer tests a reduction 175 in the volumetric flow rate through the CCS 12. This may be conducted as a sensitivity test, but may be reduced by some threshold amount to determine whether the turbidity may be cleaned up by simply allowing a longer settling time of the effluent in the dispersion band 120. If the reduction 175 is effective, then the monitoring 167 continues. Upon execution of the dynamic flush 170, the hot flush 172, the reduction in flow rate, or the reduction 175 in flow rate, the process 166 returns to the monitoring step 167.

However, if the test 174 is affirmative, a dynamic flush, hot flush, and reduced volumetric flow rate have all been tried based on the current test data. None of those actions 170, 172, 175 has resolved the problem. This requires the next test 176 to determine whether optimization 177 has been conducted.

Optimization is a parametric optimization searching for the optimum performance parameters in a space defined by a performance variable of the CCS 12. It has a system parameter of operation the independent variable, a fluid condition being monitored as a dependent variable, and a volumetric flow rate as another independent variable to be marched through (incrementally advanced) in a third-dimension of that mathematical space.

If optimization has not yet been conducted, a negative response to the test 176 results in an optimization 177 of the process controls. Immediately, the system and method 166 return to monitoring 167. If the test 168, once again detects a rise in turbidity, vibration, or both outside the acceptable range over the time of interest, then the test 176 indicates that optimization 177 was already done, and has still failed to solve the problem.

An affirmative result to the test 176 leads to a hot static solvent flush 178 initiated on one of two bases. For example, one basis is that all other mechanisms 170, 172, 175, 177 for curing the problem have failed to sufficiently ameliorate the fluid condition "complained of" by the monitoring 167. Thus, a hot, static, solvent flush with the CCS 12 in a non-operative condition is in order.

However, if the test 173 indicates that vibration was the increase detected, above some threshold value of change over a designated observation time, an affirmative response takes the process 166 directly to the hot, static, solvent flush 178. If a return to monitoring 167 detects that the rise in turbidity or vibration still exists, a more drastic result may be indicated by a test 179, such as a tear down 180. The hot static solvent flush 178 has already failed to cure the problem. A manual cleaning and inspection may be in order. This requires a manual tear down 180, and cleaning the most invasive of remedies. Ultimately, the system returns 181 to operation.

In static cleaning, the same tubes 62 may carry the cleaning fluid, at the same pressures, flow rates, etc. as in dynamic flushing. Nevertheless, typically, static cleaning is without system operation. Any rotation is slow, often manual, and so forth as needed to promote various drainage. Typically, the drain ports 84, having no internal cavity or lip, drain directly. Heat, solvents, agitation, and the like may be used. Detergents, surfactants, or even abrasives in slurries through the tubes 62 are possible accelerants. Nevertheless, entrained solvents may create their own additional problems to be handled.

Typically, the unique trapezoidal shape of the CCS 12, and the configuration of the tubes 62 and drains 84 facilitate cleaning without disassembly. Drains 84 may be sized suitably to permit penetration thereof by specialized wands. Even grit or ball blasting may occur. Abrasive cleaning slurries may be passed through the flush tube 54, tubes 52, or independent RPM wands penetrating the drain apertures 84. Moreover, cleaning materials may pass through the influent annulus 56 and tubes 60 in certain circumstances and removed through the tube 66 or drain ports 84. Aggressive cleaning processes may be employed in the static mode.

Figure 18:
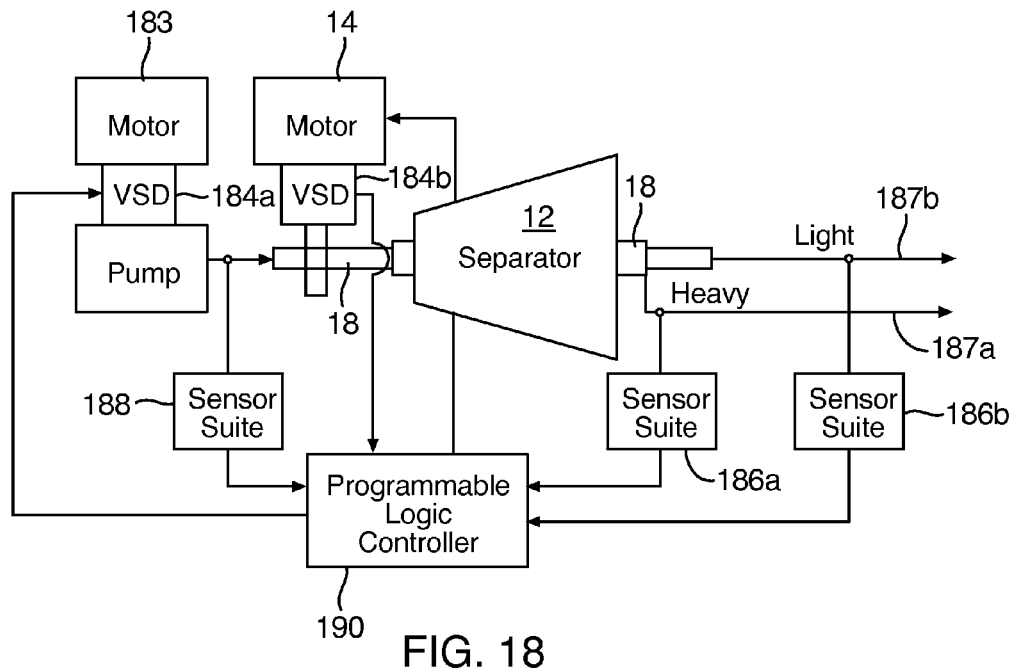
FIG. 18 is a schematic block diagram of a continuous centrifugal separator system having feedback control for operational optimization.

Referring to FIG. 18, a system 10 may include control of a CCS 12 with appropriate sensing, feedback control, and the like, provided by a controller. In the illustrated embodiment, a pump 182 providing an influent to the CCS 12 may be driven by a motor 183, controlled by a variable speed drive 184a. Likewise, a motor 14 may drive the shaft 18, and thus rotate the CCS 12 through a variable speed drive 184b.

The CCS 12 may receive feedback through a sensor suite 186. In the illustrated embodiment, a sensor suite 186a may be operably connected to the CCS 12, the outlet line 187a for the heavy species 116, or both. Likewise, the sensor suite 186b may be operably connected to monitor vibration, for example, of the CCS 12, as well as the fluid condition of the lighter species 114 in the line 187b.

Data collected by the sensor suite 186a, 186b may be passed to a programmable logic controller 190. Meanwhile, a sensor suite 188 connected to the influent line 189 may monitor the incoming condition of the influent. For example, the CCS 12, properly monitored should be monitored, for outputs through the lines 187 in view of inputs through the line 189. Thus, the sensor suite 188 may monitor the fluid conditions of the influent passing into and out of the CCS 12 from an input line 189, fed by the pump 182.

In certain embodiments, the sensor suite 188 may monitor the pump 182, CCS 12, or both for operational parameters, such as rotating velocity throughout and so forth.

Ultimately, data reflecting the system operational parameters for the pump 182, drive motor 183, CCS 12, and drive motor 14 may be passed to the programmable logic controller 190. Meanwhile, data on fluid conditions from the sensor suites 186, 188 may also be passed to the programmable logic controller 190.

With the input data providing mechanical operational parameters as well as fluid condition parameters, the programmable logic controller 190 may be programmed to feed back control signals to the variable speed drive 184 be on the motor 14, and the variable speed drive 184a on the pump motor 183. These may adjust, respectively, the rotational velocity in RPM's or angular velocity of the CCS 12, or the mass or volumetric flow rate out of the pump 182 into the CCS 12. Thus, a total feedback control process may be provided for a CCS 12, previously not susceptible to such, and which seems currently unknown in the CCS art.

Figure 19:
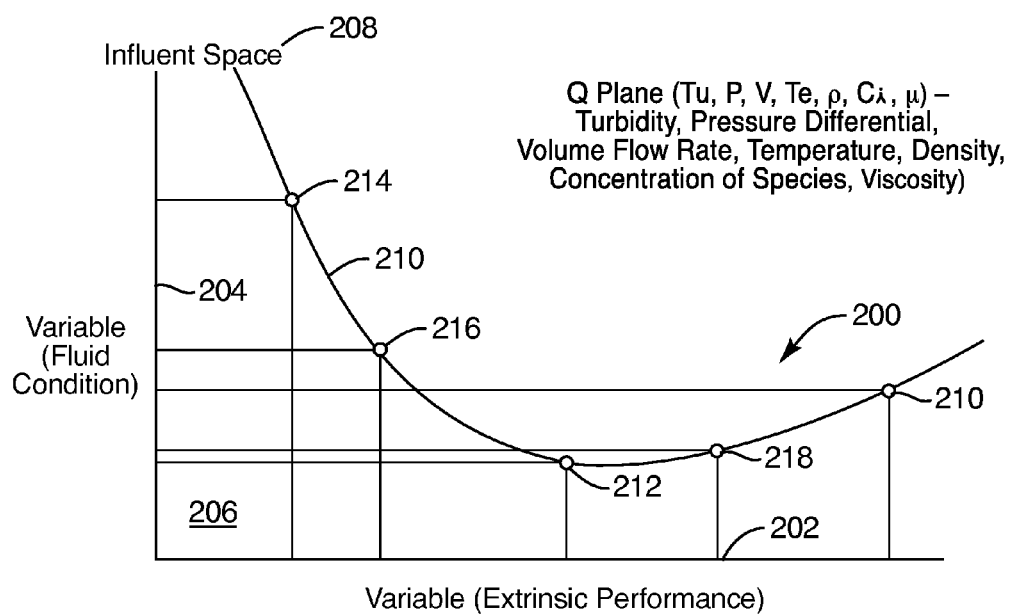
FIG. 19 is a chart illustrating a local minimum in a fluid condition as a function of an operational performance parameter at a particular flow rate in a particular influent space in accordance with the invention.

Referring to FIG. 19, the chart 200 illustrates an independent axis 202 for a performance variable 202 in a system 10. A dependent variable 204 or dependent variable axis 204 provides a graduated measurement of a second, dependent, variable, reflecting a fluid condition in the system 10. Typically, the space 206 is a plane 206 representing a specific flow rate within an overall influent space 208.

A multi-dimensional mathematical space may be represented by charts 200 in two or three dimensions, four if color or time is permitted, five if both. However, in the static FIG. 20, the plane 206 may be thought of as a slice of a three-dimensional space that extends along the axis 202, and axis 204, and through several different planes 206 of volumetric flow rates. In turn, each of these three-dimensional spaces, with its multiplicity of curves 210, along each plane 206, represents the influence of the independent variable 202 on the value of the dependent variable 204.

Thus, the performance variable 202 of the system 10 or the mechanical and extrinsic performance parameter 202 for the system 10 is accounted for its influence on the dependent fluid condition variable 204. All of these exist in an influent space 208 that varies with the constituents, ratios, and so forth of an influent. For example, changing from two to three species, or to ten species, from two to fifty percent oil, or twenty percent solids to all water except trace solids, creates different influent spaces 208. Thus, changing certain conditions that render a particular chart 200 inapplicable may be thought of mathematically as changing to a different influent space 208.

Certain characteristic locations 212, 214, 216, 218 may be identified along the curve 210. For example, the point 210 represents a local minimum in the value of the independent variable 204 at some point along the axis 202 of the independent variable 202. A location at a point 214 represents the slope or derivative as substantially constant but non-zero.

At the point 212, the derivative value is zero, but changing at a positive rate, becoming more positive at the point 218. The large negative slope of the curve at the point 214 is ameliorated to a lesser slope at the point 216, to a zero value at the point 212.

Meanwhile, the second derivative or the change in the slope at the point 214, increases at point 216, and eventually results in the value of the first derivative or slope at the point 218. However, further along the curve 210, the slope once again becomes positive, rather than negative, at the point 214, but nevertheless substantially constant, indicating that the second derivative has decreased substantially, and may pass to zero, or an inflection point.

Thus, optimization within any particular plane 206 may be executed to find a local minimum 212, or a favored operational position. Here, the fluid condition shown is improved if reduced, such as parts-per-million of persistently entrained, undesired species. However, a local maximum may be substituted for a local minimum 212, depending on the desirable independent variable 204. By any means, however, the planes 206 may be tested to find a minimum along a z axis (e.g., here, flow rate) perpendicular (orthogonal) to the space 206 of the variable axes 202, 204. Thus, a local minimum in multiple-dimensions may be used to optimize the fluid condition 204 output in response to the mechanical operation parameters 202 as inputs.

In an optimization process, for example, a dependent variable 204 may be turbidity or vibration. One may test at a frequency, or by some other identifiable interval, whether regular or irregular, whether linear or nonlinear. One may, for example, detect various points 212, 214, 216, and so forth as one progresses along the space 206 defining a decrease in the independent variable 204, such as a decrease in turbidity or a decrease in vibration. This may be detected as one changes the value of some particular variable 202, such as, for example, the volumetric flow rate through a CCS 12.

As one detects that the first derivative or slope of the curve 210 at a point 214 is substantially constant and negative, one may detect that over a series of samples sufficient to detect that slope at or around a point 214. One may detect that the turbidity or vibration being tested or sampled is indeed at a particular value, the point 214 on the curve 210, but decreasing. Thus, as the independent variable 202, such as volumetric flow rate is increasing in that event, the turbidity or vibration is decreasing. Accordingly, one may detect that one is approaching soon a local minimum 212, depending on the function and first derivative at the point 214 and on the function and first derivative at the point 216.

Moreover, one may interpolate, extrapolate, curve fit, or use numerical methods to predict about when the local minimum 212 is likely to be reached. Accordingly, one may step ahead to search faster for the local minimum 212. One may effectively bracket it by stepping clear past the minimum 212 to a point 218. At the point 218, the first derivative is noted to be increasing. Accordingly, one knows that one has now passed the local minimum 212, without finding it. One may then interpolate or otherwise analyze to determine where the local minimum 212 may be.

In the case of an asymptotic curve, such as if the curve 210 were approaching the independent variable axis 202, while monotonically decreasing, a sequential sampling at an ever increasing interval may detect that no convergence is occurring, or no change of the monotonic decrease. Thus, one may deduce the asymptotic behavior is trending toward a limit. Thus pursuing a further minimum is fruitless, at a finite cost.

Similarly, the independent variable 202 may be, for example, the rotation of velocity of the CCS 12. By changing a temperature, a rotation velocity, or a volumetric flow rate, one may change the independent variable. Likewise, other dependent variables may be detected such as turbidity or pressure differentials. The flow may be heated. In other embodiments, one may treat the turbidity, pressure, volumetric flow rate, temperature, density, concentration of particular species, or the like as an independent variable on the influent. Alternatively, one may use each of those parameters as a dependent variable measured for an effluent. Thus, one may detect changes in density in the effluent, changes in temperature, changes in pressure differentials between ports, and the like.

Likewise, concentration may be parts per million or parts per volume on the influent, effluent, or both. Such measurements on influents are inputs into the system. Such measurements on outputs or changes between outputs and inputs may be thought of as dependent variables 204 identifying a fluid condition as a result of the operation of the system 10. Local minima, and suitable intervals about those local minima, may establish operational boundaries of input parameters 202, for particular, desired fluid conditions or other operational conditions as dependent variables 204.

As stated previously, local maxima may be the desired result, and may likewise be searched for in any influent space. Moreover, an influent space 208 may be substituted by some other space. For example, some other variable in the system may change, or may be changed without human ability to control it. Accordingly, that establishes a new space which may be characterized by a series of charts 200 as illustrated.

In one embodiment, a CCS 12 may be cleaned using a mill flush. In this process, a shell 16 is taken offline, and partially drained to reduce the contained liquids. Liquid depth may be established at less than the distance between a nozzle 64 and the surface 74. It is possible to use even less liquid. Typically, the liquid is dominated by water.

In certain embodiments, heat, solvent, and pressurized spraying through the nozzles 64 against the surface 74 may be used alone or in combination. Likewise, such processes may be repeated. Additional benefit may be obtained by rotating the shell 16 at a velocity providing a centripetal acceleration toward the axle of about 1 g. In the illustrated embodiment, this corresponds to about forty RPM. By maintaining the angular velocity at the outer surface 74 sufficiently low to keep the angular acceleration below 1 g, the contained, limited liquid will fall from the surface 74 before arriving at a top dead center (TDC) of the shell 16.

The resulting impact of the liquid falling from the surface 74 toward the shaft 18 provides impact forces breaking up solid materials residing in the liquid, as well as additional materials that may exist elsewhere. Moreover, as the shell 16 rotates past TDC, and particularly when a fin 88 passes horizontal, the combined fluid and entrained solids will fling outward toward the surface 74. This adds impact commination of any agglomerated solid materials, while disrupting, breaking, abrading, and otherwise scouring deposits from the surface 74. Dislodged solids entrain in the liquid, subjecting themselves to impact breakup as the process continues, and contributing to an abrasive slurry to further scour the surface 74.

Such a system may begin by introducing water after fully draining the shell1 16. Thus, the system may rely on water, heat, solvents, abrasives, solid additives, such as steel balls, or the like, or a combination or subcombination thereof.

Water may be introduced by spraying through the open air of a drained shell 16, to create a spray having high impact velocity. Moreover, exposure to air tends to break up certain deposits by virtue of a cycling surface tension. For example, a combination of liquids and solids may be exposed to air, changing surface tension forces. Thereafter, re-exposure to water, changes the value and direction of such forces. Cycling between the water beading up in a sphere, and opening up into a bulk quantity, tends to disrupt the deposits.

In addition to more effective nozzle momentum and the assistance in break up by exposure to air, a process may increase the abrasive action, increased discontinuity of the impact, or movement of agglomerated chunks. The use of other accelerants such as heat, solvents, and spray contributes to the flexibility in designing a cleaning process for a specific system at a specific site dealing with a specific type of deposits having a particular, local chemistry.

Rinsing may be effected by a spray flush, and increasing the rotation to about triple or more. In certain embodiments illustrated hereinabove, from 80 to 200 RPM works and 140 RPM is a suitable target rotation rate. Accordingly, cleaning may be repeated, may use production liquids, fresh water, deposits as abrasive, synthetic additives as abrasives, solid impact spheres, and other variations to tailor a cleaning process. Draining at multiple g accelerations may rely on the pick up tubes 66. Thus, the process may operate as a dynamic cleaning or a static cleaning process.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
   providing a centrifugal separator having an outer wall, surrounding a cavity and rotatable on a central shaft in rigid body motion therewith about a central axis, thereby defining length, radius, and circumference in, respectively, axial, radial, and circumferential directions and having an inlet end spaced axially away from an outlet end, and a heavy outlet and light outlet proximate the outlet end;

introducing a flow into a conduit extending radially from the central shaft into the cavity proximate the inlet end;

re-directing the flow toward the axial direction by modifying turbulent intensity of the flow along the radial direction by discharging through exits distributed radially, circumferentially, and each cut diagonally across its respective conduit;

establishing a laminar, annular, velocity distribution (LAVD) in the cavity proximate the inlet end;

the establishing the LAVD by reducing turbulent intensity of the flow moving axially along the cavity;

the establishing the LAVD, wherein the reducing turbulent intensity comprises stripping eddy circulations occurring in non-axial directions.

2. The method of claim 1, wherein the modifying turbulent intensity further comprises:

exposing more of the flow in the conduit with distance along the radial direction, to a fluid already in the cavity and outside the conduit.

3. The method of claim 1, wherein:

the centrifugal separator further comprises a plurality of inlet conduits distributed such that adjacent outlets of all thereof are offset from one another axially along the cavity and offset from one another in the circumferential direction; and the flow is staged axially by distributing the flow among the inlet conduits.

4. The method of claim 1, wherein:

the centrifugal separator further comprises a plurality of inlet conduits, each inlet conduit thereof further offsetting, in the radial direction, an outlet flow therefrom by a difference in length between circumferentially adjacent ones thereof and by the outlet flow exiting through the openings.

5. The method of claim 1, further comprising offsetting each inlet of a plurality of inlets axially, radially, and circumferentially from one another.

6. The method of claim 1, further comprising rendering the flow laminar and axial by staging the introducing the flow circumferentially, axially, and radially.

7. The method of claim 6, wherein the stripping eddy circulations further comprises passing the flow through a first rectifier plate orthogonally oriented with respect to an axial direction of flow as the first contact of a bulk of the flow after exiting the inlet conduits, a majority of the surface area of the first rectifier plate being removed to form apertures perforating the first rectifier plate and sized to strip eddy circulations.

8. The method of claim 7, further comprising:

providing a plurality of conduits proximate the inlet end and each characterized by a conduit diameter thereof passing a portion of the flow therethrough;

passing the flow through a second rectifier plate, the first and second rectifier plates being provided with apertures, having diameters of values less than half the value of each of the conduit diameters.

9. The method of claim 8, further comprising providing the first and second rectifier plates, wherein the apertures therein are arranged in rows offset from one another at a distinct radius for each, each corresponding row in axially adjacent plates being axially and circumferentially offset from one another.

10. The method of claim 9, further comprising:

providing substantially identical first and second rectifier plates;

providing the first and second rectifier plates having the apertures thereof arranged in sets, each set distributed along a radius of the respective first and second rectifier plate, adjacent sets being offset from one another by an angle; and offsetting the first and second rectifier plates to misalign corresponding, respective sets thereof with respect to one another by less than half the angle.

11. The method of claim 7, further comprising:

the introducing the flow, wherein the flow comprises a first, carrier, species and a second, dispersed, species dispersed within the carrier species;

migrating the first and second species radially away from one another;

establishing a dispersion band comprising the second species dispersed in the first species;

dividing, by the dispersion band, a first band constituting a separated portion of the first species from a second band constituting a separated portion the second species;

providing the rectifier plate with apertures selected to establish the LAVD across the cavity in a region of maximum velocity in the LAVD.

12. The method of claim 11, wherein:

providing a coalescence plate extending orthogonally to the direction of flow of the first and second species through the cavity and being coated with a first-species-philic and second-species-phobic coating on an upstream face thereof; and dividing by the dispersion band further comprises coalescing, by the coalescence plate, first droplets of the second species, impinging thereagainst, to second droplets larger than the first droplets.

13. The method of claim 1, further comprising:

providing a rotor shell forming the cavity, the rotor shell having a radius monotonically increasing from proximate the inlet end to proximate the outlet end, all on the central shaft of substantially constant radius.

14. The method of claim 13, wherein:

the rotor shell is fixed to a central shaft to rotate therewith;

the fluid is pressurized above atmospheric pressure; and the rotor shell and central shaft are sealed against venting vapors to the atmosphere.

15. The method of claim 1, further comprising:

providing a coalescence plate orthogonal to a bulk flow through the cavity having a core region comprising a first face coated with a coating selected to be first-species-phobic with respect to a first, carrier, species in the flow and second-species-philic with respect to a second, dispersed, species dispersed within the first species in the flow;

intercepting, by the coalescence plate, a dispersion band comprising the second species dispersed in the first species;

smearing first droplets, each having a droplet volume, of the second species on the first face;

coalescing, by the coalescence plate, a portion of the first droplets into at least one of a bulk flow of the second species, separated from the first species, and second droplets of volume larger than the volume the first droplets.

16. The method of claim 15 further comprising:

passing a portion of the bulk flow of the second species through perforations directly through the first face.

17. The method of claim 1, further comprising optimizing an efficiency of separating a heavy species, corresponding to the heavy outlet, and a light species, corresponding to the light outlet, from one another by controlling a radial location of a dispersion band through at least one of:
- the time-based, first derivative of a pressure differential between the heavy outlet and light outlet;
- the time-based, second derivative of pressure differential between the heavy outlet and light outlet;
- the time-based, first derivative of at least one of a value of vibration and a value of turbidity; and
- the time-based, second derivative of at least one of the value of vibration and the value of turbidity.

18. A method of separating a dispersed species from a carrier species, the method comprising:
- providing a continuous, centrifugal separator (CCS) comprising a rotor shell having a radius monotonically increasing from an inlet end to an outlet end thereof for receiving an influent, a first rectifier plate and a second rectifier plate, a coalescence plate, a light exit port proximate the outlet end, and a heavy exit port proximate the outlet end;
- the providing a CCS, wherein the rotor shell defines a cavity with axial, radial, and circumferential directions and comprises inlet conduits, each having a length and being located to present an exit opening cut diagonally thereacross to stage distribution of the influent radially and axially;
- introducing a flow through the inlet conduit in a radial direction;
- modifying the turbulent intensity of the flow by the gradual introduction of the flow into the cavity out of the exit openings cut diagonally across the inlet conduits;
- establishing a laminar, annular, velocity distribution (LAVD) in the cavity by reducing the turbulent intensity of the flow moving axially along the cavity;
- stripping eddy circulations occurring in non-axial directions by passing the flow through the first rectifier plate;
- passing the flow through the second rectifier plate, the first and second rectifier plates being substantially identical, having apertures arranged in sets distributed along radii corresponding thereto, the radii of adjacent sets being offset by an angle;
- providing the first and second rectifier plates clocked with respect to one another by less than half the angle;
- the introducing the flow, wherein the flow comprises a first, carrier, species and a second, dispersed, species dispersed within the carrier species;
- migrating the first and second species radially away from one another;
- establishing a dispersion band comprising the second species dispersed in the first species and registered with a region of maximum velocity in the LAVD; and
- dividing, by the dispersion band, a first band constituting a separated portion of the first species from a second band constituting a separated portion the second species;
- dividing by the dispersion band further comprising coalescing, by the coalescence plate, first droplets of the second species, impinging thereagainst.

19. The method of claim 18, further cleaning the CCS by a process comprising:
- operating the CCS at operational conditions, receiving the influent at an operational rate;
- disrupting deposits on a surface of the rotor shell by jetting a flushing flow thereagainst during the operating;
- migrating the flushing flow containing the deposits, axially along the rotor shell to a location of maximum diameter thereof;
- extracting from the rotor shell at least a portion of the deposits and the flushing flow.

* * * * *